(12) United States Patent
Jiang et al.

(10) Patent No.: US 9,168,500 B2
(45) Date of Patent: Oct. 27, 2015

(54) GASIFIER FLUIDIZATION

(71) Applicants: Weibin Jiang, Aurora, CO (US); Bruce E. McComish, Mitchell, SD (US); Bryan C. Borum, Commerce City, CO (US); Benjamin H. Carryer, Dubuque, IA (US); Mark D. Ibsen, Highlands Ranch, CO (US); Mark K. Robertson, Denver, CO (US); Eric R. Elrod, Arvada, CO (US); Sim Weeks, Duluth, GA (US); Harold A. Wright, Longmont, CO (US)

(72) Inventors: Weibin Jiang, Aurora, CO (US); Bruce E. McComish, Mitchell, SD (US); Bryan C. Borum, Commerce City, CO (US); Benjamin H. Carryer, Dubuque, IA (US); Mark D. Ibsen, Highlands Ranch, CO (US); Mark K. Robertson, Denver, CO (US); Eric R. Elrod, Arvada, CO (US); Sim Weeks, Duluth, GA (US); Harold A. Wright, Longmont, CO (US)

(73) Assignee: RES USA, LLC, Commerce City, CO (US)

( * ) Notice: Subject to any disclaimer, the term of this patent is extended or adjusted under 35 U.S.C. 154(b) by 380 days.

(21) Appl. No.: 13/651,996

(22) Filed: Oct. 15, 2012

(65) Prior Publication Data

US 2013/0109765 A1 May 2, 2013

Related U.S. Application Data

(60) Provisional application No. 61/551,582, filed on Oct. 26, 2011.

(51) Int. Cl.
| | | |
|---|---|---|
| *C07C 27/00* | (2006.01) | |
| *C10J 1/28* | (2006.01) | |
| *B01J 3/00* | (2006.01) | |
| *B01J 8/18* | (2006.01) | |
| *C10G 2/00* | (2006.01) | |
| *C10G 49/00* | (2006.01) | |
| *C10K 1/32* | (2006.01) | |
| *C10K 3/00* | (2006.01) | |
| *C10J 3/48* | (2006.01) | |
| *C10J 3/50* | (2006.01) | |
| *C10K 3/04* | (2006.01) | |

(52) U.S. Cl.
CPC ... *B01J 8/18* (2013.01); *C10G 2/00* (2013.01); *C10G 2/30* (2013.01); *C10G 49/007* (2013.01); *C10J 3/48* (2013.01); *C10J 3/482* (2013.01); *C10J 3/50* (2013.01); *C10K 1/32* (2013.01); *C10K 3/00* (2013.01); *C10K 3/04* (2013.01); *C01B 2203/025* (2013.01); *C01B 2203/0244* (2013.01); *C01B 2203/0283* (2013.01); *C01B 2203/043* (2013.01); *C01B 2203/0405* (2013.01); *C01B 2203/048* (2013.01); *C01B 2203/0415* (2013.01); *C01B 2203/0475* (2013.01); *C01B 2203/0485* (2013.01); *C01B 2203/062* (2013.01); *C01B 2203/0877* (2013.01); *C01B 2203/146* (2013.01); *C10J 2300/093* (2013.01); *C10J 2300/0909* (2013.01); *C10J 2300/0969* (2013.01); *C10J 2300/0976* (2013.01); *C10J 2300/0993* (2013.01); *C10J 2300/1606* (2013.01); *C10J 2300/1659* (2013.01); *C10J 2300/1671* (2013.01); *C10J 2300/1807* (2013.01); *C10J 2300/1815* (2013.01); *C10J 2300/1823* (2013.01)

(58) Field of Classification Search
CPC .... C10K 3/00; C10G 2/00; C01B 2203/0244; C01B 2203/025; C01B 2203/0405; C01B 2203/0475; C01B 2203/062
USPC ....................... 518/702, 700; 48/197 R, 62 R
See application file for complete search history.

(56) References Cited

U.S. PATENT DOCUMENTS

| | | | |
|---|---|---|---|
| 4,828,581 A | 5/1989 | Feldmann et al. | |
| 5,508,118 A | 4/1996 | Hayashi et al. | |
| 5,980,858 A * | 11/1999 | Fujimura et al. | ............. 423/655 |
| 7,879,756 B2 | 2/2011 | Demirel et al. | |
| 8,241,523 B2 | 8/2012 | Apanel et al. | |
| 8,668,753 B2 * | 3/2014 | Goetsch et al. | ............. 48/197 R |
| 2002/0134019 A1 * | 9/2002 | Paisley | ........................ 48/197 R |
| 2007/0270511 A1 | 11/2007 | Melnichuk et al. | |
| 2009/0062108 A1 | 3/2009 | Demirel et al. | |
| 2009/0075814 A1 | 3/2009 | Duvenhage et al. | |
| 2009/0298678 A1 | 12/2009 | Demirel et al. | |
| 2010/0050654 A1 | 3/2010 | Chiu et al. | |

(Continued)

FOREIGN PATENT DOCUMENTS

| | | |
|---|---|---|
| DE | 102008014799 | 9/2009 |
| EP | 1136542 | 9/2001 |
| EP | 1207132 | 5/2002 |

OTHER PUBLICATIONS

International Preliminary Report on Patentability dated May 8, 2014 for corresponding International Application No. PCT/US2012/060231 (8 pgs.).

(Continued)

*Primary Examiner* — Jafar Parsa
(74) *Attorney, Agent, or Firm* — Timothy S. Westby; Porter Hedges LLP

(57) ABSTRACT

A method of producing synthesis gas by introducing a feed material to be gasified into a gasification apparatus comprising at least one fluidized component operable as a fluidized bed, wherein the gasification apparatus is configured to convert at least a portion of the feed material into a gasifier product gas comprising synthesis gas; and maintaining fluidization of the at least one fluidized component by introducing a fluidization gas thereto, wherein the fluidization gas comprises at least one component other than steam. A system for producing synthesis gas is also provided.

46 Claims, 4 Drawing Sheets

(56) References Cited

U.S. PATENT DOCUMENTS

| | | |
|---|---|---|
| 2010/0181539 A1 | 7/2010 | Apanel et al. |
| 2010/0305220 A1 | 12/2010 | Kukkonen et al. |
| 2010/0311570 A1 | 12/2010 | Duvenhage et al. |
| 2011/0048296 A1 | 3/2011 | Maghdissian et al. |

OTHER PUBLICATIONS

International Search Report dated Mar. 29, 2013 for corresponding International Application No. PCT/US2012/060231 (12 pgs.).

European Search Report dated Apr. 24, 2015 for corresponding European Application No. 12844610.1-1361 (9 pgs.).

\* cited by examiner

GASIFIER FLUIDIZATION

CROSS-REFERENCE TO RELATED APPLICATIONS

This application claims the benefit under 35 U.S.C. §119 (e) of U.S. Provisional Patent Application No. 61/551,582, filed Oct. 26, 2011, the disclosure of which is hereby incorporated herein by reference.

STATEMENT REGARDING FEDERALLY SPONSORED RESEARCH OR DEVELOPMENT

Not applicable.

BACKGROUND

1. Field of the Invention

This disclosure relates generally to the field of gasification. More specifically, the disclosure relates to a system and method for the production of synthesis gas via gasification of carbonaceous materials. Still more specifically, the disclosed system and method provide for enhanced gasification of carbonaceous materials via incorporation of alternative gasifier fluidization gas in place of, or in addition to, steam.

2. Background of the Invention

Gasification is utilized to produce process gas suitable for the production of various chemicals, for the production of Fischer-Tropsch liquid hydrocarbons, and for the production of power. Many feed materials may serve as carbonaceous sources for gasification, including, for example, shredded bark, wood chips, sawdust, sludges (e.g., sewage sludge), municipal solid waste (MSW), refuse-derived fuel (RDF), and a variety of other carbonaceous materials.

Fischer-Tropsch (FT) synthesis represents a catalytic method for the creation of synthetic liquid fuels. The reaction occurs by the metal catalysis of an exothermic reaction between carbon monoxide and hydrogen gas in mixtures known as synthesis gas, or 'syngas' The liquid product of the reaction is typically refined to produce a range of synthetic fuels, lubricants and waxes. The primary metals utilized as catalysts are cobalt and iron. Providing synthesis gas having a desired molar ratio of hydrogen to carbon monoxide is necessary for economic production of Fischer-Tropsch synthesis products.

One concern when producing synthesis gas via gasification is the moisture content thereof. For example, excessive amounts of water vapor in the gasification product gas may be undesirable for numerous synthesis gas end uses, such as, but not limited to, Fischer-Tropsch synthesis, power generation, and the production of non-Fischer-Tropsch chemicals.

Accordingly, there is a need in the art for improved systems and methods of gasification, whereby gas produced elsewhere in the gasification may be utilized to advantage as fluidization gas for a fluidized bed pyrolyzer, thus reducing the amount of steam required therefor. Desirably, such improved systems and methods enable utilization of an alternate gasifier fluidization gas that may (e.g., tailgas) or may not (e.g., product synthesis gas) otherwise be considered a waste product, the utilization of the alternate gas enables the production of additional synthesis gas therefrom, the utilization of the alternate gas alters the composition (e.g., the ratio of hydrogen to carbon monoxide in the synthesis gas produced thereby) of the resulting gasifier product gas in a desirable manner, or some combination thereof.

SUMMARY

Herein disclosed is a method of producing synthesis gas, the method comprising: introducing a feed material to be gasified into a gasification apparatus comprising at least one fluidized component operable as a fluidized bed, wherein the gasification apparatus is configured to convert at least a portion of the feed material into a gasifier product gas comprising synthesis gas; and maintaining fluidization of the at least one fluidized component by introducing a fluidization gas thereto, wherein the fluidization gas comprises at least one component other than steam. In embodiments, the fluidization gas comprises less than about 100, 90, 80, 70, 60, 50, 40, 30, 20, or 10 volume percent steam. In embodiments, the fluidization gas comprises substantially 0 volume percent steam. The at least one component may be selected from the group consisting of natural gas, flue gas, synthesis gas, LP fuel gas, Fischer-Tropsch tailgas, product upgrader offgas, VSA tailgas, PSA tailgas, exhaust gas, $CO_2$-rich gas, dryer vent gas, combustion air, oxygenates, and combinations thereof.

In embodiments, the method further comprises producing the at least one component downstream of the gasification apparatus. The method may further comprise conditioning the gasifier product gas to provide a conditioned synthesis gas having a molar ratio of hydrogen to carbon monoxide that is different from the molar ratio of hydrogen to carbon monoxide in the gasifier product gas, a reduced amount of at least one component relative to the amount of that component in the gasifier product gas, or both. The method may further comprise separating hydrogen from at least a portion of the conditioned synthesis gas to provide a separated hydrogen stream and a hydrogen-reduced gas, and utilizing at least a portion of the hydrogen-reduced gas as fluidization gas. The method may further comprise converting at least a portion of the conditioned synthesis gas into Fischer-Tropsch hydrocarbons via Fischer-Tropsch synthesis, and upgrading at least a portion of the Fischer-Tropsch hydrocarbons via reaction with at least a portion of the separated hydrogen stream. In embodiments, conditioning the gasifier product gas comprises introducing at least a portion of the gasifier product gas into a synthesis gas conditioner configured to alter the molar ratio of hydrogen to carbon monoxide in the gasifier product gas. The synthesis gas conditioner may comprise a partial oxidation reactor. The partial oxidation reactor may be configured for operation at a temperature in the range of from about 900° C. to about 1500° C., from about 1000° C. to about 1300° C., or from about 1150° C. to about 1250° C. The method may further comprise producing oxygen-enriched air for introduction into the partial oxidation reactor, whereby producing oxygen-enriched air produces a nitrogen-rich product, and utilizing at least a portion of the nitrogen-rich product as gasifier fluidization gas. In embodiments, producing oxygen-enriched air comprises vacuum swing adsorption.

In embodiments, the method further comprises conditioning the gasifier product gas to provide a conditioned synthesis gas having a molar ratio of hydrogen to carbon monoxide that is different from the molar ratio of hydrogen to carbon monoxide in the gasifier product gas, a reduced amount of at least one component relative to the amount of that component in the gasifier product gas, or both, and synthesis gas conditioning comprises reforming at least a portion of the synthesis gas, thus producing a conditioned synthesis gas having an altered molar ratio of hydrogen to carbon monoxide relative to the molar ratio of hydrogen to carbon monoxide in the gasifier product gas.

In embodiments, the method further comprises conditioning the gasifier product gas to provide a conditioned synthesis gas having a molar ratio of hydrogen to carbon monoxide that is different from the molar ratio of hydrogen to carbon monoxide in the gasifier product gas, a reduced amount of at least one component relative to the amount of that component in the gasifier product gas, or both, and synthesis gas conditioning comprises extracting a carbon dioxide-rich fuel gas from at least a portion of the gasifier product gas, and the method further comprises utilizing at least a portion of the carbon dioxide-rich fuel gas as fluidization gas. Extracting a carbon dioxide-rich fuel gas from at least a portion of the gasifier product gas may comprise introducing the at least a portion of the gasifier product gas into a carbon dioxide removal unit. The carbon dioxide removal unit may operate via pressure differentiation. In embodiments, the carbon dioxide removal unit is a pressure swing adsorption (PSA) unit.

In embodiments, the at least one component is produced downstream of the gasification apparatus, and the method further comprises converting at least a portion of the synthesis gas into Fischer-Tropsch hydrocarbons via Fischer-Tropsch synthesis. The method may further comprise subjecting at least a portion of the Fischer-Tropsch hydrocarbons to product upgrading, wherein product upgrading produces a product upgrading offgas, and utilizing at least a portion of the product upgrading offgas as fluidization gas. In embodiments, the at least one fluidized component comprises a fluidized bed gasifier, and at least a portion of the product upgrading offgas is introduced as gasifier fluidization gas.

In embodiments, the at least one component is produced downstream of the gasification apparatus, the method further comprises converting at least a portion of the synthesis gas into Fischer-Tropsch hydrocarbons via Fischer-Tropsch synthesis, Fischer-Tropsch conversion of the at least a portion of the synthesis gas produces a Fischer-Tropsch tailgas, and at least a portion of the Fischer-Tropsch tailgas is utilized as fluidization gas. The method may further comprise extracting a carbon dioxide-enriched gas from at least a portion of the Fischer-Tropsch tailgas, and utilizing at least a portion of the carbon dioxide-enriched gas as fluidization gas. Extracting a carbon dioxide-enriched gas from at least a portion of the Fischer-Tropsch tailgas may comprise contacting the at least a portion of the Fischer-Tropsch tailgas with a membrane designed for hydrogen recovery, thus providing a low BTU carbon dioxide-enriched fuel gas, and utilizing at least a portion of the carbon dioxide-enriched gas as fluidization gas. In embodiments, the Fischer-Tropsch synthesis is associated with the production of a Fischer-Tropsch wastewater comprising oxygenates, and the method further comprises stripping oxygenates from at least a portion of the Fischer-Tropsch wastewater via contact thereof with at least a portion of the Fischer-Tropsch tailgas, to produce an oxygenate-containing Fischer-Tropsch tailgas and an oxygenate-reduced Fischer-Tropsch wastewater, and utilizing at least a portion of the oxygenate-containing Fischer-Tropsch tailgas as fluidization gas.

In embodiments, the at least one component is produced downstream of the gasification apparatus, the method further comprises converting at least a portion of the synthesis gas into Fischer-Tropsch hydrocarbons via Fischer-Tropsch synthesis, the Fischer-Tropsch synthesis is associated with the production of a Fischer-Tropsch wastewater comprising oxygenates, and the method further comprises stripping oxygenates from at least a portion of the Fischer-Tropsch wastewater via contact thereof with steam, to produce an oxygenate-containing steam and an oxygenate-reduced Fischer-Tropsch wastewater, and utilizing at least a portion of the oxygenate-containing steam as fluidization gas.

In embodiments, the at least one component is produced downstream of the gasification apparatus, and the method further comprises converting at least a portion of the synthesis gas into Fischer-Tropsch hydrocarbons via Fischer-Tropsch synthesis, a hydrocarbon-containing purge gas is extracted during Fischer-Tropsch synthesis, and at least a portion of the hydrocarbon-containing purge gas is utilized as fluidization gas.

In embodiments, the at least one component is produced upstream of the gasification apparatus. The at least one component may comprise natural gas. The method may further comprise drying at least a portion of the feed material to reduce the moisture content thereof prior to introduction into the gasification apparatus. Drying the at least a portion of the feed material may further comprise contacting the at least a portion of the feed material with a drying medium to provide the reduced moisture gasifier feed material and a dryer vent gas comprising volatile organic compounds (VOC's). The method may further comprise utilizing at least a portion of the dryer vent gas as fluidization gas. In embodiments, the drying medium comprises superheated steam.

In embodiments, the gasification apparatus comprises a dual fluidized bed gasifier comprising a fluidized bed pyrolyzer fluidly connected with a fluidized bed combustor such that a circulation stream comprising a heat transfer material can be continuously circulated between the pyrolyzer, in which the temperature of the circulation stream is reduced via endothermal pyrolysis, and the fluidized bed combustor, in which the temperature of the circulation stream is increased, and wherein the fluidized bed combustor is operable to increase the temperature of the circulation stream via combustion of at least char introduced thereto with the circulation stream. In embodiments, combustion in the combustor produces a combustor flue gas, and the method further comprises utilizing at least a portion of the combustor flue gas as fluidization gas. The gasifier feed material may be introduced into the pyrolyzer from a feed bin configured for storage of gasifier feed material, and the method may further comprise introducing at least a portion of the combustor flue gas into the feed bin, whereby direct contact of the combustor flue gas with the gasifier feed material provides a dried gasifier feed material for introduction into the pyrolyzer and a feed bin vent gas, and the method may further comprise utilizing at least a portion of the feed bin vent gas as fluidization gas. In embodiments, combustion in the combustor is effected via introduction thereto of hot combustion air, and the method further comprises utilizing a portion of the hot combustion air as fluidization gas for at least one other component of the dual fluidized bed gasifier in addition to the fluidized bed combustor.

In embodiments, the gasification apparatus comprises a pyrolyzer operable at low pressure (e.g. less than 25 or 50 psig, or in the range of 25 to 50 psig), and the at least one component comprises low pressure (LP) fuel gas (e.g. having a pressure of less than 25 or 100 psig, or in the range of 25 to 100 psig).

In embodiments, the method further comprises utilizing at least a portion of the gasifier product gas to produce power, utilizing at least a portion of the gasifier product gas in a catalytic operation downstream of the gasification apparatus, or both.

In embodiments, the method further comprises obtaining a desired molar ratio of hydrogen to carbon monoxide in the gasifier product gas by adjusting the amount, composition, or both the amount and the composition of the at least one non-steam component of the fluidization gas.

In embodiments, the method further comprises adjusting the amount, composition, or both of the at least one non-steam component of the fluidization gas such that the moisture content of the gasifier product gas is below a desired level.

In embodiments, the method further comprises performing vacuum swing adsorption (VSA), pressure swing adsorption (PSA), or both, downstream of the gasification apparatus, thus producing at least one tailgas selected from the group consisting of VSA tailgas and PSA tailgas, and utilizing at least a portion of the at least one tailgas as the at least one non-steam component of the fluidization gas.

In embodiments, the method further comprises producing, downstream of the gasifier, at least one product selected from the group consisting of Fischer-Tropsch hydrocarbons, power, and non-Fischer-Tropsch chemicals from at least a portion of the gasifier product gas. Such a method may further comprise utilizing at least a portion of a hydrocarbon-containing fluid produced downstream of the gasifier as the at least one non-steam component of the fluidization gas.

In embodiments, the at least one fluidized component is selected from the group consisting of fluidized bed pyrolyzers, fluidized bed combustors, gasifier seal pots, and combustor seal pots. In embodiments, the at least one fluidized component is selected from the group consisting of pyrolyzers and seal pots. The method may comprise utilizing at least a portion of the gasifier product gas as fluidization gas.

Also disclosed herein is a system for the production of synthesis gas, the system comprising: a gasification apparatus configured to convert at least a portion of a gasifier feed material introduced thereto into a gasification product gas comprising synthesis gas having a molar ratio of hydrogen to carbon monoxide, wherein the gasification apparatus comprises at least one vessel configured for fluidization of the contents thereof via introduction thereto of a fluidization gas comprising at least one non-steam component; at least one additional apparatus selected from the group consisting of feed preparation apparatus located upstream of the gasification apparatus and configured to prepare a carbonaceous material for introduction into the gasification apparatus; synthesis gas conditioning apparatus configured to produce a conditioned synthesis gas having a molar ratio of hydrogen to carbon monoxide that is different from the molar ratio of hydrogen to carbon monoxide in the gasification product gas, to provide a conditioned synthesis gas having a reduced amount of at least one component relative to the amount of that component in the gasification product gas, or both; and synthesis gas utilization apparatus configured to convert at least a portion of the synthesis gas into a desired product; and at least one line fluidly connecting the at least one additional apparatus or an outlet of the gasification apparatus with the at least one vessel of the gasification apparatus, whereby a gas from the at least one additional apparatus or exiting the gasification apparatus may provide the at least one non-steam component of the fluidization gas. The at least one vessel may be configured for fluidization with a fluidization gas comprising less than about 100, 90, 80, 70, 60, 50, 40, 30, 20, or 10 volume percent steam, or comprising substantially 0 volume percent steam. In embodiments, the at least one non-steam component is selected from the group consisting of flue gas, synthesis gas, LP fuel gas, Fischer-Tropsch tailgas, product upgrader offgas, VSA tailgas, PSA tailgas, exhaust gas, $CO_2$-rich gas, dryer vent gas, combustion air, oxygenates, VOC's, and combinations thereof.

In embodiments, the system comprises synthesis gas conditioning apparatus downstream of the gasification apparatus, and a recycle line fluidly connecting the synthesis gas conditioning apparatus with the gasification apparatus, whereby at least a portion of a gas exiting the synthesis gas conditioning apparatus may be utilized as fluidization gas. The synthesis gas conditioning apparatus may comprise a partial oxidation reactor. The partial oxidation reactor may be configured for operation at a temperature in the range of from about 900° C. to about 1500° C., from about 1000° C. to about 1300° C., or from about 1150° C. to about 1250° C. The system may further comprise air-enrichment apparatus configured to provide oxygen-enriched air or substantially pure oxygen for introduction into a partial oxidation reactor, thus producing an oxygen-reduced product gas, and a recycle line fluidly connecting the air-enrichment apparatus with the at least one vessel, whereby at least a portion of the oxygen-reduced product gas may be utilized as fluidization gas. The air-enrichment apparatus may be selected from the group consisting of vacuum swing adsorbers (VSA's) and pressure swing adsorbers (PSA's).

In embodiments, the system comprises synthesis gas conditioning apparatus comprising a carbon-dioxide removal apparatus configured to remove a carbon dioxide-rich fuel gas from at least a portion of the gasification product gas, and a recycle line fluidly connecting the carbon-dioxide removal apparatus with the at least one vessel, whereby at least a portion of the carbon dioxide-rich fuel gas can be utilized as fluidization gas. The carbon dioxide removal apparatus may comprise a pressure swing adsorption (PSA) unit.

In embodiments, the system comprises a feed preparation apparatus, and a line fluidly connecting a vent gas outlet of the feed preparation apparatus with the gasification apparatus, whereby at least a portion of a vent gas exiting the feed preparation apparatus can be utilized as fluidization gas. The feed preparation apparatus may comprise a dryer configured to reduce the moisture content of a relatively wet gasifier feed material to provide a reduced moisture feed material for introduction into the gasification apparatus by contacting the relatively wet gasifier feed material with a drying medium to provide the reduced moisture gasifier feed material and a dryer vent gas comprising volatile organic compounds (VOC's). The drying medium may comprise superheated steam.

In embodiments, the desired product is selected from the group consisting of power, Fischer-Tropsch hydrocarbons, and non-Fischer-Tropsch chemicals. In embodiments, the synthesis gas utilization apparatus comprises Fischer-Tropsch synthesis apparatus configured to convert at least a portion of the gasification product gas into Fischer-Tropsch hydrocarbons, thus producing a Fischer-Tropsch tailgas, and the at least one recycle line fluidly connects the Fischer-Tropsch synthesis apparatus with the gasification apparatus, whereby at least a portion of the Fischer-Tropsch tailgas can be utilized as fluidization gas. In embodiments, a Fischer-Tropsch wastewater comprising oxygenated components is also produced via the Fischer-Tropsch synthesis apparatus and the system further comprises a stripper configured to contact at least a portion of the Fischer-Tropsch wastewater with at least a portion of the Fischer-Tropsch tailgas, whereby oxygenates are stripped from the Fischer-Tropsch wastewater by the Fischer-Tropsch tailgas, thus producing an oxygenate-reduced Fischer-Tropsch wastewater and an oxygenate-enriched Fischer-Tropsch tailgas, and the at least one recycle line fluidly connects the stripper with the gasification apparatus, whereby at least a portion of the oxygenate-enriched Fischer-Tropsch tailgas can be utilized as fluidization gas.

In embodiments, the synthesis gas utilization apparatus comprises Fischer-Tropsch synthesis apparatus configured to convert at least a portion of the gasification product gas into Fischer-Tropsch hydrocarbons, thus producing a Fischer-Tropsch tailgas, and the at least one recycle line fluidly connects the Fischer-Tropsch synthesis apparatus with the gasification apparatus, whereby at least a portion of the Fischer-Tropsch tailgas can be utilized as fluidization gas, and a Fischer-Tropsch wastewater comprising oxygenated components is also produced via the Fischer-Tropsch synthesis apparatus, and the system further comprises a steam stripper configured to contact at least a portion of the Fischer-Tropsch wastewater with steam, whereby oxygenates are stripped from the Fischer-Tropsch wastewater by the steam, thus producing an oxygenate-reduced Fischer-Tropsch wastewater and an oxygenate-enriched steam, and the at least one recycle line fluidly connects the steam stripper with the gasification apparatus, whereby at least a portion of the oxygenate-enriched steam can be utilized as fluidization gas.

In embodiments, the synthesis gas utilization apparatus comprises Fischer-Tropsch synthesis apparatus configured to convert at least a portion of the gasification product gas into Fischer-Tropsch hydrocarbons, thus producing a Fischer-Tropsch tailgas, and the at least one recycle line fluidly connects the Fischer-Tropsch synthesis apparatus with the gasification apparatus whereby at least a portion of the Fischer-Tropsch tailgas can be utilized as fluidization gas, and the system further comprises a carbon dioxide removal apparatus configured to separate a carbon dioxide-rich gas from the Fischer-Tropsch tailgas, thus providing a carbon dioxide-reduced Fischer-Tropsch tailgas, and wherein the at least one recycle line fluidly connects the carbon dioxide removal apparatus with the gasification apparatus, whereby at least a portion of the carbon dioxide-rich gas can be utilized as fluidization gas. The system may comprise a recycle line whereby the carbon dioxide-reduced Fischer-Tropsch tailgas can be introduced into a synthesis gas conditioning apparatus upstream of the Fischer-Tropsch apparatus, a recycle line whereby the carbon dioxide-reduced Fischer-Tropsch tailgas can be introduced into the Fischer-Tropsch synthesis apparatus, or both. The carbon dioxide removal apparatus may comprise a membrane designed for hydrogen recovery, configured to provide a low BTU carbon dioxide-enriched fuel gas.

In embodiments, the synthesis gas utilization apparatus comprises Fischer-Tropsch synthesis apparatus configured to convert at least a portion of the gasification product gas into Fischer-Tropsch hydrocarbons, thus producing a Fischer-Tropsch tailgas, and at least one recycle line fluidly connects the Fischer-Tropsch synthesis apparatus with the gasification apparatus, whereby at least a portion of the Fischer-Tropsch tailgas can be utilized as fluidization gas, and the system further comprises product upgrading apparatus configured to convert at least a portion of the Fischer-Tropsch hydrocarbons to more desirable hydrocarbons, wherein the product upgrading apparatus is configured to produce a product upgrading tailgas, and at least one recycle line fluidly connects the product upgrading apparatus with the gasification apparatus, whereby at least a portion of the product upgrading tailgas can be utilized as fluidization gas. Such a system may further comprise synthesis gas conditioning apparatus downstream of the gasification apparatus, and may further comprise hydrogen recovery apparatus configured to separate hydrogen from a portion of the conditioned synthesis gas, and a line fluidly connecting the hydrogen separation apparatus with the product upgrading apparatus, whereby separated hydrogen can be utilized therein.

In embodiments, the synthesis gas utilization apparatus comprises Fischer-Tropsch synthesis apparatus configured to convert at least a portion of the gasification product gas into Fischer-Tropsch hydrocarbons, thus producing a Fischer-Tropsch tailgas, and the at least one recycle line fluidly connects the Fischer-Tropsch synthesis apparatus with the gasification apparatus whereby at least a portion of the Fischer-Tropsch tailgas can be utilized as fluidization gas, wherein the synthesis gas utilization apparatus produces a hydrocarbon containing purge gas, and wherein the synthesis gas utilization apparatus is fluidly connected with the gasification apparatus whereby at least a portion of the hydrocarbon-containing purge gas can be utilized as fluidization gas.

In embodiments of the system, the at least one additional apparatus comprises at least one unit selected from the group consisting of pressure swing adsorbers (PSA's), vacuum swing adsorbers (VSA's) and product upgraders (PU's), and the at least one recycle line fluidly connects the at least one unit with the gasification apparatus, whereby a tailgas produced in the at least one unit can be utilized as fluidization gas.

In embodiments of the system, the gasification apparatus is a dual fluidized bed gasifier comprising a fluidized bed pyrolyzer fluidly connected with a fluidized bed combustor such that a circulation stream comprising a heat transfer material can be continuously circulated between the fluidized bed pyrolyzer, in which the temperature of the circulation stream is reduced via endothermal pyrolysis, and the fluidized bed combustor, in which the temperature of the circulation stream is increased, and the fluidized bed combustor is operable to increase the temperature of the circulation stream via combustion of at least char introduced thereto with the circulation stream, and the gasification apparatus optionally further comprises a gasifier seal pot, a combustor seal pot, or both, and the at least one vessel is selected from the pyrolyzer, the combustor, the combustor seal pot, and the gasifier seal pot. In embodiments, the combustor is configured to produce a combustor flue gas, and the at least one recycle line fluidly connects the combustor with the at least one vessel whereby at least a portion of the combustor flue gas may be utilized as fluidization gas. In embodiments, the feed preparation apparatus comprises a feed bin configured for storage of gasifier feed material, and the system further comprises a recycle line configured for introducing at least a portion of the combustor flue gas into the feed bin, whereby direct contact of the at least a portion of the combustor flue gas with the gasifier feed material provides a dried gasifier feed material for introduction into the gasifier, and a feed bin vent gas, and wherein the at least one recycle line fluidly connects a dryer vent gas outlet line with the gasification apparatus whereby at least a portion of a dryer vent gas can be utilized as fluidization gas.

In embodiments of the system, the gasification apparatus is a dual fluidized bed gasifier comprising a fluidized bed pyrolyzer fluidly connected with a fluidized bed combustor such that a circulation stream comprising a heat transfer material can be continuously circulated between the fluidized bed pyrolyzer, in which the temperature of the circulation stream is reduced via endothermal pyrolysis, and the fluidized bed combustor, in which the temperature of the circulation stream is increased, and the fluidized bed combustor is operable to increase the temperature of the circulation stream via combustion of at least char introduced thereto with the circulation stream, and the gasification apparatus optionally further comprises a gasifier seal pot, a combustor seal pot, or both; the at least one vessel is selected from the group consisting of the pyrolyzer, the gasifier seal pot, and the combustor seal pot; and the combustor is configured to increased the temperature of the circulation stream via combustion of at least char in the circulation stream by contact with hot combustion air; and the at least one recycle line fluidly connects a combustion air inlet line with the at least one vessel, whereby at least a portion of the hot combustion air can be utilized as fluidization gas.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of embodiments of the invention, reference will now be made to the accompanying drawings, wherein like numbers indicate like parts unless otherwise apparent, and wherein.

NOTATION AND NOMENCLATURE

Figure 1:
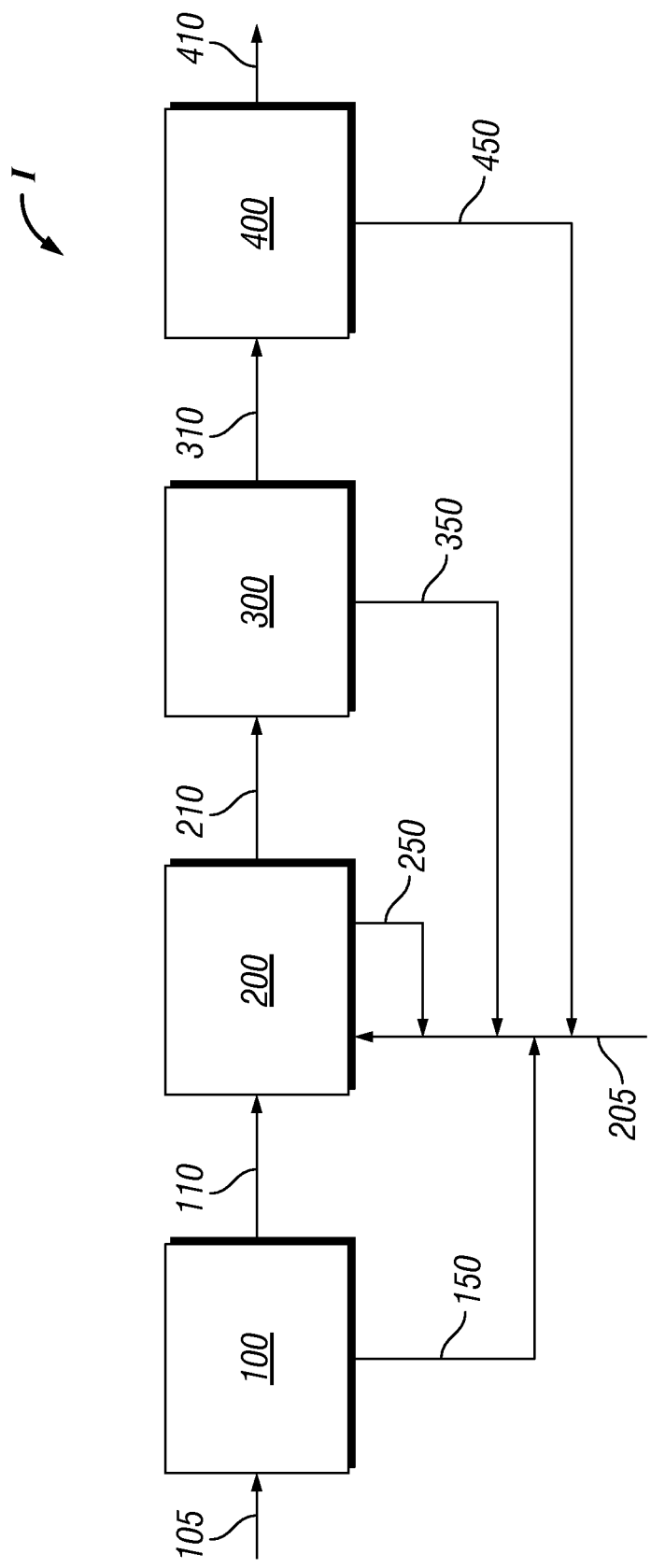
FIG. 1 is schematic of a gasification system according to an embodiment of this disclosure.

Certain terms are used throughout the following description and claims to refer to particular system components. This document does not intend to distinguish between components that differ in name but not function.

The terms 'pyrolyzer' and 'gasifier' are used interchangeably herein to refer to a reactor configured for endothermal pyrolysis.

Use of the terms 'fluidized' and 'fluidizable' with reference to a system component is meant to indicate that the component is configured for operation via introduction thereto of a fluidization gas, e.g., configured for operation as a fluidized bed.

DETAILED DESCRIPTION

Overview. Herein disclosed are a gasification system and method. The disclosed gasification system and method incorporate the application of an alternate gas to fluidize the contents of at least one fluidizable unit of a gasification apparatus. The alternate fluidization gas is utilized to partially or wholly replace conventional steam fluidization. A reduction in the amount of steam utilized for fluidization may desirably reduce the expense associated with producing steam (e.g., boiler feedwater treatment) and/or may reduce the amount (e.g., the mass of steam replaced by the alternate fluidization gas) of condensate that would form, and thus reduce the expense associated with treatment of said condensate, if the product synthesis gas is subsequently cooled and the moisture therein condensed.

The disclosed system and method thus enable the use of alternative gases (i.e. other than steam alone) for fluidization of at least one fluidized component of a gasification apparatus. For example, in a system comprising a dual fluidized bed gasifier, as described hereinbelow, an alternate fluidization gas as described herein may be utilized to fluidize at least one unit selected from fluidized bed pyrolyzers, combustor seal pots, gasifier seal pots, and combustors. The other units may be conventionally fluidized. For example, in embodiments, the pyrolyzer fluidization gas comprises primarily steam and/or the combustor fluidization gas comprises primarily air, while the combustor seal pot fluidization gas, the gasifier seal pot fluidization gas, or both comprises, in part or in its entirety, an alternate fluidization gas according to this disclosure.

By way of non-limiting examples, the alternate fluidization gas can comprise fuel gas low pressure or high pressure fuel gas (e.g., natural gas/methane), synthesis gas (e.g., gasifier product gas or hydrogen-reduced synthesis gas), tailgas (e.g., PSA tailgas, VSA tailgas, product upgrader tailgas, FT tailgas), combustion air, combustor flue gas, dryer vent gas, stripper offgas, $CO_2$-rich gas, exhaust gas (e.g., boiler exhaust gas, combustion turbine exhaust gas, exhaust from a HRSG), or some combination thereof. Desirably, the alternate fluidization gas is a low value waste fuel or purge stream. The use of the alternate fluidization gas may thus reduce the cost of gasification by enabling utilization of a readily available gas, that may otherwise represent a disposal issue, in place of more costly conventional fluidization gas (e.g., in place of at least a part of the steam conventionally utilized as fluidization gas). Alternatively or additionally, utilization of an alternate fluidization gas according to this disclosure may enable production of a gasification product gas having a desired composition for an intended downstream application. For example, by reducing the amount of moisture in synthesis gas produced with a fluidization gas comprising a reduced amount of steam, the product synthesis gas may be more easily reformed to reduce the methane concentration thereof. Utilization of an alternate fluidization gas as disclosed herein may eliminate the need for steam generation equipment or may reduce the size thereof. Utilization of alternate fluidization gas as disclosed herein may improve the efficiency of the overall gasification system, as the resulting gasification product synthesis gas may have a reduced heat capacity than steam, making it easier to maintain a desired temperature thereof for downstream synthesis gas conditioning and/or utilization. In embodiments, replacing at least a portion of the conventional fluidization steam with a non-reactive gas (or 'less' reactive gas, which may be referred to herein as an 'inert' gas, although it may not be an inert gas in the conventional sense, such as $CO_2$, $N_2$) may reduce the water gas shift reaction in downstream units. In embodiments, replacing at least a portion of the fluidization steam with a $CO_2$-rich gas may result in a reduced amount of carbon dioxide being produced in the gasifier, and/or an increased carbon conversion. In embodiments, replacing at least a portion of the fluidization steam with an alternate fluidization gas reduces the amount of waste water produced relative to that conventionally generated from the production of boiler feed water and/or from the condensation of steam utilized on the syngas/process side (i.e. on the gasifier side) of a gasification apparatus.

Gasification System and Method. A gasification system according to this disclosure comprises gasification apparatus configured to produce a gasifier product gas comprising, but not limited to, hydrogen and carbon monoxide (i.e. synthesis gas), and may further comprise at least one additional apparatus selected from gasifier feed preparation apparatus, synthesis gas conditioning apparatus, and synthesis gas utilization apparatus. At least one of the additional apparatus and/or an outlet of the gasification apparatus is fluidly connected with the gasification apparatus, whereby a gas exiting the additional apparatus or the gasification apparatus may be introduced into the gasification apparatus as a fluidization gas therefor.

As discussed in detail hereinbelow, gasifier feed preparation apparatus is configured to prepare a carbonaceous feedstock for gasification in the gasification apparatus. For example, the feedstock preparation apparatus may be configured to comminute, dry and/or store a gasifier feedstock. Synthesis gas conditioning apparatus is configured to alter the composition of the gasifier product gas. For example, a synthesis gas conditioning apparatus may be configured for conversion of the synthesis gas introduced thereto into a more desirable synthesis gas, for example, by altering the molar ratio of hydrogen to carbon monoxide therein. Alternatively or additionally, synthesis gas conditioning apparatus may be configured to remove an undesirable component from the gasifier product gas introduced thereto (e.g., to remove aerosols, sulfur constituents, inorganic nitrogen constituents, hydrochloric acid, carbon dioxide, excess hydrogen, excess carbon monoxide, tars, residual solids, water, etc., therefrom). Synthesis gas utilization apparatus is configured for the production of a desired product from synthesis gas produced in the gasification apparatus. For example, synthesis gas utilization apparatus can comprise power generation apparatus, Fischer-Tropsch synthesis apparatus, apparatus configured for the production of non-Fischer-Tropsch fuels or chemical(s) from synthesis gas, etc. Each of these components will be described in more detail hereinbelow.

FIG. 1 is a schematic of a gasification system I according to an embodiment of this disclosure. Gasification system I comprises gasifier feed preparation apparatus 100, gasification apparatus 200, synthesis gas conditioning apparatus 300, and synthesis gas utilization apparatus 400. Raw feed inlet line 105 is configured to introduce a raw feed material into feed preparation apparatus 100. Gasification apparatus 200 is fluidly connected with feed preparation apparatus 100 via prepared gasifier feed line 110. Gasification apparatus 200 is fluidly connected with synthesis gas conditioning apparatus 300 via gasifier product gas outlet line 210. Synthesis gas utilization apparatus 400 is fluidly connected with synthesis gas conditioning apparatus 300 via synthesis gas conditioner outlet line 310. Product line 410 carries product out of synthesis gas utilization apparatus 400. As mentioned hereinabove, the syngas may be utilized to produce power, non-Fischer-Tropsch chemicals, Fischer-Tropsch hydrocarbons, such as, but not limited to, FT naphtha, FT jet fuel, FT diesel, and FT gasoline, or some combination thereof.

As indicated in FIG. 1, at least one line fluidly connects gasification apparatus 200 with one of the other apparatus 100, 300 and/or 400, or connects an outlet of gasification apparatus 200 with an inlet thereof, whereby a gas from the additional apparatus or from the gasification apparatus itself may be utilized to fluidize (alone or in combination with at least one other fluidization gas) at least one unit of gasification apparatus 200. The disclosed fluidization gas may also be referred to herein as an 'alternate gas,' an 'alternative gas,' or an 'alternate fluidization gas,' to indicate that the fluidization gas is not entirely steam, although steam may be a component, even a main component, of some of the possible alternate fluidization gases provided herein, as will be seen hereinbelow. In embodiments, the at least one unit fluidized via the disclosed alternate fluidization gas is a pyrolyzer. In embodiments, the at least one unit is a combustor seal pot. In embodiments, the at least one component is a gasifier seal pot. In embodiments, the at least one unit fluidized via the disclosed alternate fluidization gas is a combustor.

The alternate fluidization gas may comprise a low pressure and/or low oxygen content stream. In embodiments, the alternate fluidization gas comprises process vent gas, exhaust gas from a boiler, combustion turbine, heat recovery steam generator (HRSG), process gas, or any combination thereof.

In the embodiment of FIG. 1, feed preparation apparatus gas outlet line 150 fluidly connects feed preparation apparatus 100 with gasification apparatus 200 whereby a gas produced or utilized in feed preparation apparatus 100 may be utilized to fluidize at least one component of gasification apparatus 200. In the embodiment of FIG. 1, gasification apparatus gas outlet line 250 fluidly connects an outlet of at least one component of gasification apparatus 200 with an inlet of at least one component thereof, whereby a gas produced or utilized in gasification apparatus 200 may be utilized to fluidize at least one component thereof. For example, as discussed further hereinbelow, a portion of the gasifier product gas exiting gasification apparatus 200 via gasifier product gas outlet line 210 may be introduced via line 250 into a fluidized unit of gasification apparatus 200, and/or at least a portion of a combustor flue gas produced in a dual fluidized bed (DFB) indirect gasifier (described in detail hereinbelow) may be introduced via gasification apparatus gas outlet line 250 into a fluidized component of gasification apparatus 200. In the embodiment of FIG. 1, synthesis gas conditioning apparatus gas outlet line 350 fluidly connects synthesis gas conditioning apparatus 300 with gasification apparatus 200, whereby a gas utilized and/or produced in synthesis gas conditioning apparatus 300 may be utilized to fluidize at least one fluidized unit of gasification apparatus 200. In the embodiment of FIG. 1, synthesis gas utilization apparatus gas outlet line 450 fluidly connects synthesis gas utilization apparatus 400 with gasification apparatus 200, whereby a gas utilized and/or produced in synthesis gas utilization apparatus 400 may be utilized to fluidize at least one fluidized unit of gasification apparatus 200.

Although gas outlet lines 150, 250, 350, 450 are shown combining with fluidization gas inlet line 205 in the embodiment of FIG. 1, it is to be understood that (a) any number of lines 150, 250, 350, 450 may be introduced directly into gasification apparatus 200 (i.e. into different fluidized units thereof or via multiple fluidization inlets on a single fluidized device); (b) there may be one or more gas lines from each additional apparatus or from the gasification apparatus itself (e.g. two gas lines 150 from feed preparation apparatus 100, three gas lines 450 from synthesis gas utilization apparatus 400, and the like); and (c) one or more of the alternate fluidization gases may be utilized to wholly fluidize a unit of gasification apparatus 200 (i.e. line 205 may essentially be absent, with substantially all of the fluidization gas for a fluidizable unit of gasification apparatus 200 being provided via one or more of lines 150, 250, 350, and/or 450). Furthermore, for ease of illustration, gas lines may be depicted exiting the bottom of the apparatus from which they emanate. In practice, as known to those of skill in the art, such gas lines may extract gas from a top or side portion of the respective apparatus from which the gas is obtained.

As mentioned hereinabove, synthesis gas utilization apparatus 400 can comprise any apparatus known to those of skill in the art to be operable to provide a valued product from synthesis gas. For example, by way of non-limiting example, synthesis gas utilization apparatus 400 can comprise power generation apparatus, Fischer-Tropsch synthesis and other associated apparatus (some of which are described in more detail hereinbelow with reference to FIG. 2), chemical production apparatus configured for the production of non-Fischer-Tropsch chemical(s) from synthesis gas, or any combination thereof.

Figure 2:
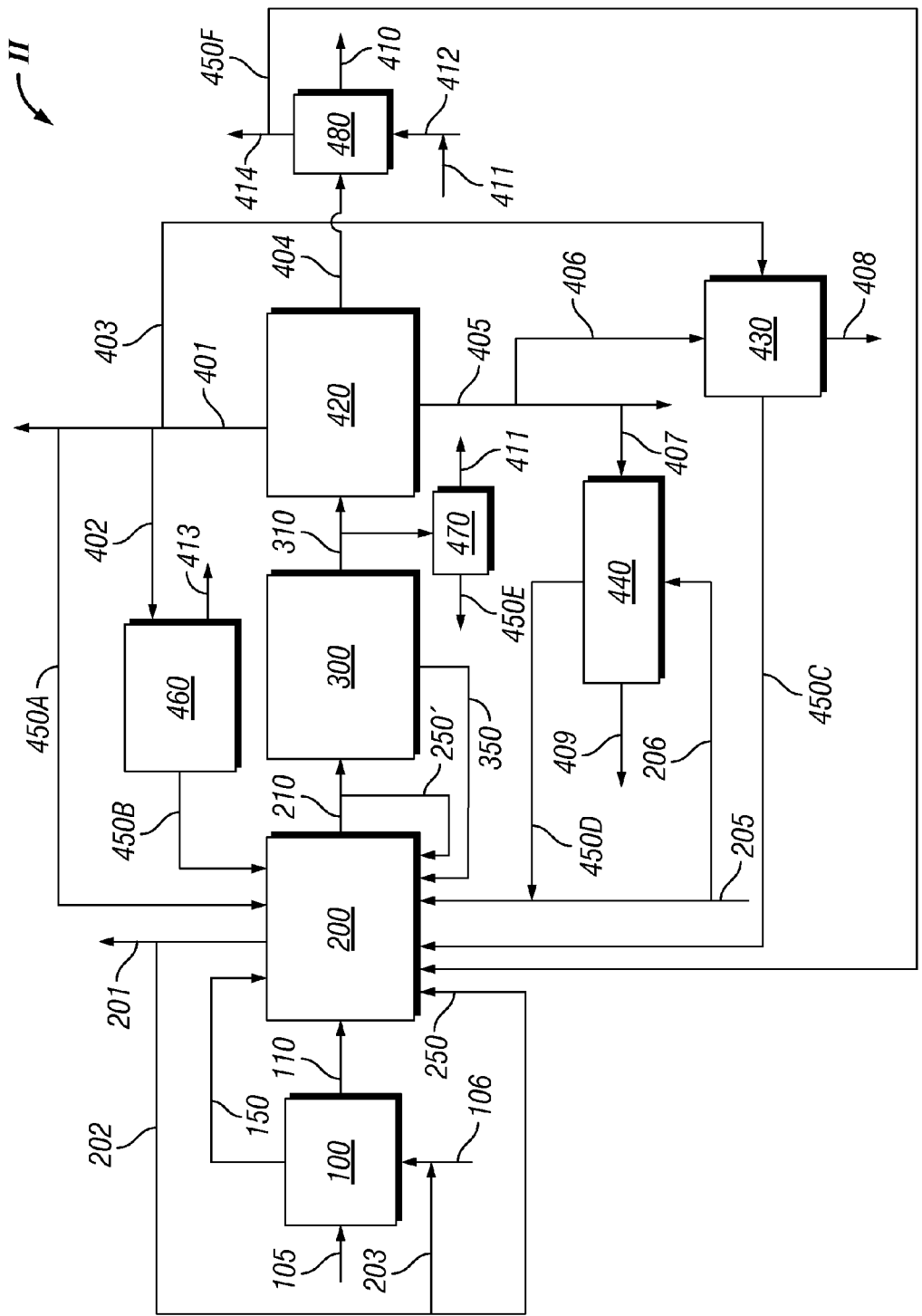
FIG. 2 is a schematic of a gasification system according to another embodiment of this disclosure.

FIG. 2 is a schematic of a system II according to another embodiment of this disclosure. System II comprises feed preparation apparatus 100, gasification apparatus 200, and synthesis gas conditioning apparatus 300. In the embodiment of FIG. 2, synthesis gas utilization apparatus 400 comprises Fischer-Tropsch (FT) synthesis apparatus 420, Fischer-Tropsch tailgas stripper 430, steam stripper 440, carbon dioxide removal apparatus 460, hydrogen recovery apparatus 470, and Fischer-Tropsch product upgrading apparatus 480. A system according to this disclosure may comprise FT synthesis apparatus 420 and one or more apparatus selected from Fischer-Tropsch tailgas stripper 430, steam stripper 440, carbon dioxide removal apparatus 460, hydrogen recovery apparatus 470, and Fischer-Tropsch product upgrading apparatus 480.

Figure 3:
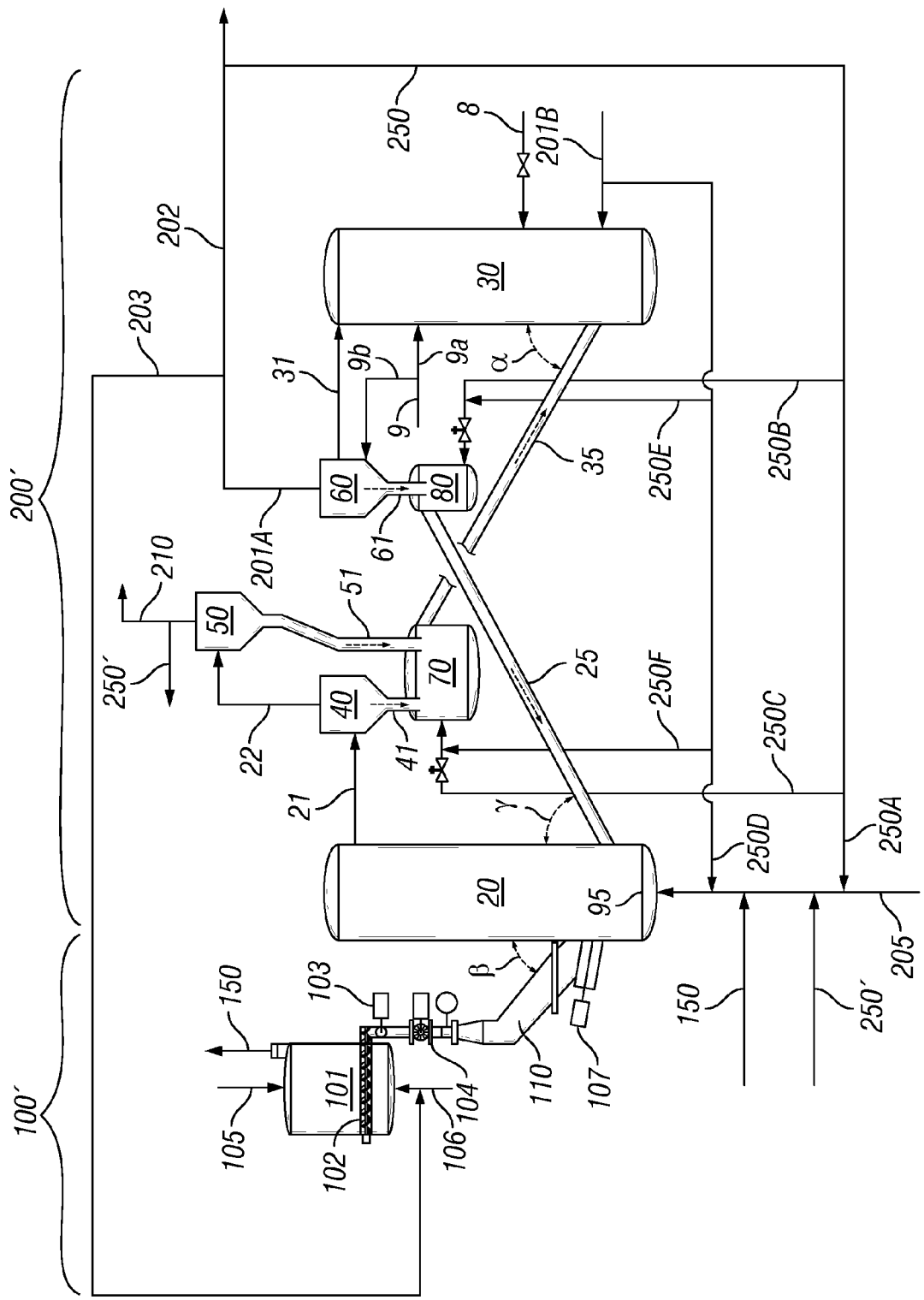
FIG. 3 is a schematic depicting a gasification apparatus and a gasifier feed preparation apparatus suitable for use in a gasification system according to an embodiment of this disclosure.

As discussed hereinabove, at least a portion of a fluidization gas for at least one unit of gasification apparatus 200 may be provided by feed preparation apparatus 100. A feed preparation apparatus may comprise any apparatus suitable for preparing a raw feed material, such as but not limited to biomass, for gasification in gasification apparatus 200. In embodiments, feed preparation apparatus 100 comprises a comminution or grinding apparatus, a dryer, a feed storage bin, or a combination thereof. For example, in the embodiment of FIG. 2, feed preparation apparatus 100 comprises a dryer. A relatively hot drying medium 106 passes through the dryer, to which feed material is introduced via feed inlet line 105. Direct or indirect contact of the drying medium with the feed material within the dryer serves to reduce the moisture content of the feed material, providing prepared gasifier feed material, which is introduced into gasification apparatus 200 via gasifier feed inlet line 110. Reduced temperature drying medium, which may now contain components extracted from the raw feed material (such as, by way of non-limiting example, volatile organic compounds, or VOC's) exits dryer 100. All or a portion of the dryer vent gas may be introduced via feed preparation gas outlet line 150 into gasification apparatus 200 for use as fluidization gas for a fluidized component thereof. The drying medium utilized in feed preparation apparatus 100 may comprise, for example, superheated steam. The dryer may be a superheated steam dryer (SSD). The SSD may utilize pressurized superheated steam as drying medium and generate a vent stream of pressurized 'dirty' steam. The 'dirty' steam can be utilized wholly or in part as alternate fluidizing gas for a fluidized component of a gasification apparatus. A potential benefit of utilizing such an alternate fluidization gas is that, when introduced into gasification apparatus 200 as fluidization gas, VOC's and/or other components present in the 'dirty' steam may be converted to syngas via pyrolysis, thus increasing the synthesis gas produced, and reducing the amount of VOC's to be disposed of elsewhere. That is, the 'dirty' steam does not have to be disposed of otherwise (e.g., in a wastewater treatment plant). Other suitable dryers are known to those of skill in the art. In applications in which gasification apparatus 200 comprises a DFB indirect gasifier, for example, as depicted in FIG. 3 and discussed further hereinbelow, at least a portion 203 of a combustor flue gas produced in a combustor of a gasification apparatus may be recycled to feedstock preparation apparatus 100', whereby direct contact of the combustor flue gas (and optionally additional drying medium introduced via line 106) with a raw gasifier feed material is utilized to reduce the moisture content of the feed material. Contact of the combustor flue gas (and optional additional drying medium) produces a dryer vent gas which may comprise volatile organic compounds (or VOC's) or other extracted components. As indicated in the embodiment of FIG. 3, a recycle line 150 may be configured to introduce at least a portion of the dryer vent gas into DFB indirect gasifier 200'. For example, the dryer vent gas may be introduced via fluidization line 205 into pyrolyzer 20 of DFB 200', or (as with the other alternate fluidization gases discussed herein) may be introduced as fluidization gas for a combustor seal pot 70, a gasifier seal pot 80, a combustor 30, or some combination thereof. Suitable seal pots will be described in detail hereinbelow with reference to FIG. 3. As indicated in the embodiment of FIG. 3, a feed preparation apparatus 100' may comprise a feed bin 101 that also functions as a dryer.

Referring back now to FIG. 2, gasification apparatus 200 comprises a gasifier (also referred to herein as a 'producer' or 'pyrolyzer'), configured to gasify a feed material introduced therein, thus producing a gasifier product gas comprising hydrogen and carbon monoxide (i.e. comprising synthesis gas or 'syngas'). Gasification apparatus 200 can comprise any gasifier known in the art. In embodiments, gasification apparatus 200 comprises a dual fluidized bed (or 'DFB') indirect gasifier. A suitable DFB indirect gasifier is described in more detail hereinbelow with reference to FIG. 3, and in U.S. Pat. No. 8,241,523, and U.S. patent application Ser. No. 13/555,732 (filed Jul. 23, 2012), the disclosure of each of which is hereby incorporated herein in its entirety for all purposes not contrary to this disclosure. In embodiments, gasification apparatus 200 is a dual fluidized bed gasifier, comprising a combustor and a pyrolyzer, as discussed in detail hereinbelow, and may further comprise one or more combustor seal pots, gasifier seal pots, primary gasifier separators (e.g., heat transfer material, HTM, and char cyclone(s)), secondary gasifier separators (e.g., heat transfer material, HTM and char cyclone(s)), and/or combustor separators (e.g., primary heat transfer material, HTM, and/or secondary ash cyclone(s)). Suitable examples of each of the components of a representative DFB indirect gasifier are described hereinbelow.

A DFB indirect gasifier may be configured for operation by introducing inlet gas at a low gas velocity to fluidize a high average density bed in a gasifier/pyrolysis vessel. The high average density bed may comprise a relatively dense fluidized bed in a lower region thereof, the relatively dense fluidized bed containing a circulating heated relatively fine and inert particulate heat transfer material. Carbonaceous material may be introduced into the lower region at a relatively high rate and endothermal pyrolysis of the carbonaceous material accomplished by means of a circulating heated inert material, producing a gasifier product gas comprising synthesis gas (i.e. comprising hydrogen and carbon monoxide). In embodiments, in an upper region of the pyrolyzer is a lower average density entrained space region containing an entrained mixture comprising inert solid, particulate heat transfer material, char, unreacted carbonaceous material and product gas. The entrained mixture is removed from the gasifier to one or more separators, such as a cyclone, wherein solids (heat transfer particles, char and/or unreacted carbonaceous material) are separated from the gasification product gas. At least a portion of the removed solids is returned to the pyrolyzer after reheating to a desired temperature via passage through an exothermic reaction zone of an external combustor. Combustion of the char, and optionally any supplemental combustor fuel, along with combustion air in the combustor produces a combustor flue gas, as discussed hereinbelow with reference to FIG. 3.

As indicated in FIG. 2, in embodiments, a recycle line 250' fluidly connects a gasifier product gas outlet of gasification system 200 (for example, an outlet line 21 of a pyrolyzer/gasifier 20 or an outlet 22/210 of a primary or a secondary separator 40/50 associated therewith) with an inlet of gasification apparatus 200, whereby a portion of the gasifier product gas can be utilized to fluidize a fluidized component of gasification system 200. In such embodiments, a compressor may be utilized to increase the pressure of the gasifier product gas prior to recycle to system 200. In applications in which gasification apparatus 200 comprises a dual fluidized bed gasifier, such as the DFB indirect gasifier 200' depicted in FIG. 3 and described in detail hereinbelow, a recycle line 250' may fluidly connect a gasifier product gas line, 210, with a fluidized unit of the DFB indirect gasifier. For example, a recycle line 250' may fluidly connect a gasifier product gas line 210 with gasifier fluidization gas inlet line 205, as depicted in the embodiment of FIG. 3. In embodiments, the source of stream 250 is external to gasification (i.e. other than gasifier/pyrolyzer 20, such as combustor 30). Alternatively or additionally, one or more recycle lines 250' may fluidly connect gasifier product gas line 210 with a combustor seal pot 70, a gasifier seal pot 80, a combustor 30, or some combination thereof, whereby a portion of the gasification product gas (i.e. syngas) may be utilized for fluidization thereof.

Alternatively or additionally, as indicated in the embodiment of FIG. 2, gasification apparatus 200 may produce or utilize a gas that may be recycled via line 250 to a fluidized unit of gasification system 200 for use as fluidization gas therefor. As indicated in FIG. 2, at least a portion 202 of a product gas 201 from gasification apparatus 200 may be recycled upstream of gasification apparatus 200. For example, a portion of the gas may be introduced into a fluidized unit of gasification system 200 via a line 250, and/or a portion of a gas other than product gasification gas may be introduced into the gasification apparatus 200 via lines 203 and/or 106, feed preparation apparatus 100 and recycle line 150. By way of non-limiting example, the non-syngas gas may comprise combustor flue gas produced in a combustor (e.g., a combustor of a dual fluidized bed gasifier as depicted in FIG. 3), a portion of the air provided for use as combustion air in a combustor, or both.

In applications in which gasification apparatus 200 comprises a dual fluidized bed gasifier, such as the DFB indirect gasifier 200' depicted in FIG. 3 and described in detail hereinbelow, at least a portion of a combustor flue gas produced in a fluidized bed combustor 30 and exiting therefrom via combustor outlet line 31 and/or combustor separator outlet line 201A may be recycled to a fluidized bed unit of DFB indirect gasifier 200'. As indicated in the embodiment of FIG. 3, a recycle line 250A may fluidly connect combustor 30 (optionally via one or more combustor separators 60 and/or one or more heat exchangers, as described in more detail hereinbelow) with pyrolyzer 20, whereby a portion of the combustor flue gas may be utilized to fluidize the pyrolyzer. Alternatively or additionally, a recycle line 250B may fluidly connect combustor 30 (optionally via one or more combustor separators 60 and/or one or more heat exchangers, as described in more detail hereinbelow) with a gasifier seal pot 80, whereby a portion of the combustor flue gas may be utilized to fluidize the gasifier seal pot. Alternatively or additionally, a recycle line 250C may fluidly connect combustor 30 (optionally via one or more combustor separators 60 and/or one or more heat exchangers, as described in more detail hereinbelow) with a combustor seal pot 70, whereby a portion of the combustor flue gas may be utilized to fluidize the combustor seal pot. Alternatively or additionally, a recycle line may fluidly connect combustor 30 (optionally via one or more combustor separators 60 and/or one or more heat exchangers, as described in more detail hereinbelow) with an inlet of the combustor, whereby a portion of the combustor flue gas may be utilized to fluidize the combustor. In embodiments, a compressor is utilized to increase the pressure of the combustor flue gas prior to subsequent utilization.

Alternatively, or additionally, a line 203 is configured to introduce a portion of a combustor flue gas via in line 202 as drying medium for feedstock preparation apparatus 100. In such embodiments, the drying medium introduce into feed preparation apparatus 100/100' via line 106 and utilized to dry the feed material in the dryer comprises at least a portion of the gas recycled via line(s) 202/203 from gasification apparatus 200. The drying medium may comprise another drying medium (e.g., steam) in addition to the gas recycled from gasification apparatus 200. In this manner, gas produced or utilized in the gasification apparatus may be recycled as fluidization gas for a unit of gasification apparatus 200 via passage through feed preparation apparatus 100 and feed preparation gas outlet line 150.

In applications in which gasification apparatus 200 comprises a dual fluidized bed gasifier, such as DFB indirect gasifier 200' depicted in FIG. 3 and described in detail hereinbelow, a line 203 may be configured to recycle at least a portion of a combustor flue gas exiting combustor 30 via line 31 to feedstock preparation apparatus 100', whereby (e.g. direct) contact of the combustor flue gas (and optionally additional drying medium introduced via line 106) with a raw gasifier feed material introduced via line 105 can be utilized to reduce the moisture content of the feed material. Depending on the temperature thereof, contact of the combustor flue gas (and optional additional drying medium) may produce a dryer vent gas which may comprise volatile organic compounds (or VOC's) and/or other contaminants. As indicated in the embodiment of FIG. 3, recycle line 150 may be configured to introduce the dryer vent gas into DFB indirect gasifier 200'. For example, line 150 may fluidly connect dryer 101 with gasifier 20, such that the dryer vent gas may be introduced (e.g. via fluidization line 205) into pyrolyzer 20 of DFB 200', or (as with the other alternate fluidization gases discussed herein) may be introduced as fluidization gas for a combustor seal pot 70, a gasifier seal pot 80, a combustor 30, or a combination thereof. Such components will be described in detail hereinbelow with reference to FIG. 3.

In applications in which gasification apparatus 200 comprises a dual fluidized bed indirect gasifier, such as the DFB indirect gasifier 200' depicted in FIG. 3 and described in detail hereinbelow, a portion of the combustion air produced for use in combustor 30 may be routed for use in fluidizing a fluidized component of gasification apparatus 200'. For example, as indicated in the embodiment of FIG. 3, a line 250D may fluidly connect a combustion air line 201B with pyrolyzer 20, whereby a portion of the combustion air may be utilized to fluidize pyrolyzer 20; a line 250E may fluidly connect a combustion air line 201B with gasifier seal pot 80, whereby a portion of the combustion air may be utilized to fluidize gasifier seal pot 80; and/or a line 250F may fluidly connect a combustion air line 201B with combustor seal pot 70, whereby a portion of the combustion air may be utilized to fluidize combustor seal pot 70. In embodiments, combustion air is utilized as alternate fluidization gas for gasifier 20 and/or a gasifier seal pot 80. As with the other alternate gases mentioned herein, the combustion air may be utilized either alone or in conjunction with other fluidization gas components, e.g., in combination with fluidization steam. Utilization of combustion air as alternate fluidization gas will alter the composition of the gasifier product syngas, such that it contains nitrogen. The additional nitrogen in the gasification product gas could serve as a non-water diluent, thus lowering the heat content (BTU/SCF) of the gasification product synthesis gas. Utilization of combustion air as alternate fluidization gas may increase the operating temperature of the gasifier, increasing the temperature of the product synthesis gas, and perhaps reducing the amount of tar therein. As air has a lower heat capacity than steam, unit efficiency may be increased, and/or the dew point of the product synthesis gas lowered by a reduction in the amount of steam utilized as fluidization gas.

As indicated in the embodiments of FIGS. 1 and 2, gasifier product gas (i.e. comprising syngas) produced in gasification apparatus 200 and exiting therefrom via gasifier product exit line 210 may be introduced into a synthesis gas conditioning apparatus 300 for conversion/conditioning prior production therefrom of a desired product via synthesis gas utilization apparatus 400. As mentioned above, in embodiments, a portion of the gasifier product gas is recycled to gasification apparatus 200 via line 250' for utilization as fluidization gas for at least one component of gasification apparatus 200.

A system according to an embodiment of this disclosure comprises synthesis gas conditioning apparatus 300. Synthesis gas conditioning apparatus is configured to alter the composition of the gasifier product gas introduced thereto via gasifier product gas outlet line 210, to provide a conditioned synthesis gas for a desired downstream application. As indicated in FIG. 2, one or more gas utilized or produced in synthesis gas conditioning apparatus 300 may be recycled via line 350 for use as fluidization gas in gasification apparatus 200.

Conditioning apparatus 300 can comprise any apparatus known in the art to be useful for altering the composition of the gasifier product synthesis gas. For example, a synthesis gas conditioning apparatus 300 may be configured to remove an undesired component from the gasifier product gas. Such an undesired component may be a sulfur compound (e.g., hydrogen sulfide), carbon dioxide, excess hydrogen, excess carbon monoxide, methane, etc.) A synthesis gas conditioning apparatus may operate by removing a portion of a contaminant introduced thereto via line 210, and/or or may reduce the amount of or remove an undesired component via conversion thereof into another component. Synthesis gas conditioning apparatus 300 may comprise carbon dioxide removal apparatus configured to separate carbon dioxide from the gasifier product gas introduced thereto. Alternatively or additionally, synthesis gas conditioning apparatus 300 may comprise sulfur removal apparatus configured to separate sulfur or sulfur compounds (e.g., hydrogen sulfide) from the gasifier product gas introduced thereto. Alternatively or additionally, synthesis gas conditioning apparatus 300 may comprise a water gas shift reactor configured to reduce the amount of carbon monoxide in the gasifier product gas by reacting a portion of the carbon monoxide with water to produce carbon dioxide and additional hydrogen via the water gas shift reaction (WGSR). Synthesis gas conditioning apparatus 300 may comprise a partial oxidation reactor or reformer (e.g., an autothermal reformer), as known in the art, configured to convert methane in the gasifier product gas to additional synthesis gas.

Figure 4:
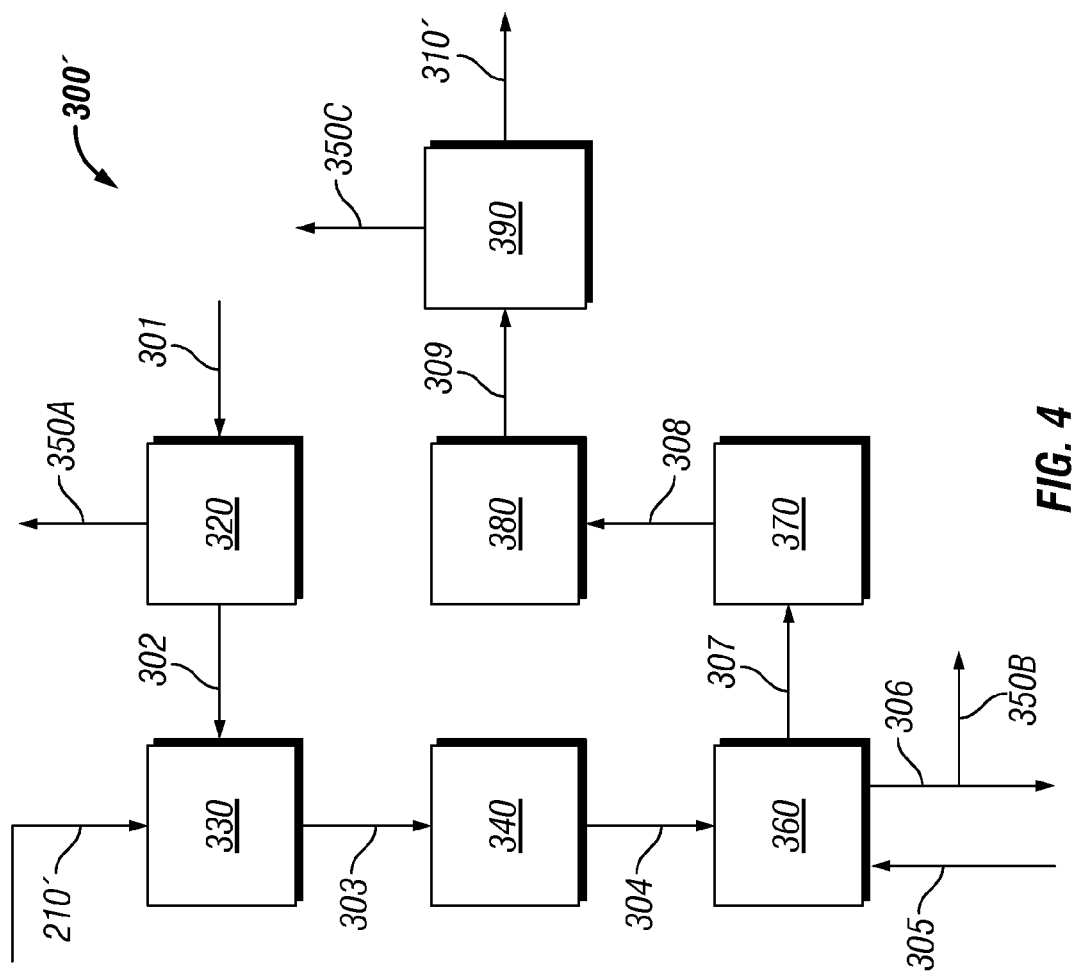
FIG. 4 is a schematic depicting a synthesis gas conditioning apparatus suitable for use in a gasification system according to an embodiment of this disclosure.

FIG. 4 is a schematic of a suitable synthesis gas conditioning apparatus 300' according to an embodiment of this disclosure. Synthesis gas conditioning apparatus 300' comprises air separation unit (e.g., a vacuum swing adsorber (VSA)) 320, syngas conditioner 330, quench apparatus 340, heat recovery/water wash apparatus 360, synthesis gas compressor 370, sulfur removal apparatus 380, and carbon dioxide removal apparatus 390. A synthesis gas conditioning apparatus according to this disclosure may comprise any combination of the units shown in FIG. 4, may comprise other units in place of or in addition to those indicated in FIG. 4, the arrangement of the units may be other than the arrangement indicated in FIG. 4, and/or a single unit may effect the reduction/removal of multiple undesirable components of the synthesis gas. For example, carbon dioxide removal apparatus 390 may be positioned prior to syngas conversion apparatus 330 and/or a single acid gas removal (AGR) unit may be operable as a sulfur removal apparatus 380 and carbon dioxide removal apparatus 390.

At least a portion 210' of the gasifier product gas produced in gasification apparatus 200 may be introduced into synthesis gas conditioning apparatus 300/300'. In the embodiment of FIG. 4, the at least a portion of the gasifier product gas is introduced via gasifier product gas outlet line 210' into synthesis gas conversion unit or conditioner 330. Synthesis gas conversion unit 330 may be any synthesis gas conditioning apparatus known in the art. For example, synthesis gas conditioning apparatus 330 may be selected from tar wash removal systems (e.g., OLGA units), reformers, and partial oxidation reactors. In embodiments, synthesis gas conversion apparatus 330 comprises a partial oxidation (POx) reactor. The POx reactor may be operable at a temperature in the range of from about 900° C. to about 1500° C., from about 1090° C. to about 1315° C., from about 1150° C. to about 1260° C., or from about 1170° C. to about 1230° C. In embodiments, synthesis gas conversion apparatus 330 is selected from reformers, such as, but not limited to, autothermal reformers (ATR's), and steam methane reformers. Synthesis gas conversion apparatus 330 may be operable with carbon dioxide, oxygen or steam. In embodiments, synthesis gas conversion apparatus 330 is operable with oxygen or oxygen-enriched air. In such embodiments, the synthesis gas conditioning apparatus 300/300' may further comprise an air separation unit (or 'ASU') 320. Any suitable air separation unit known to one of skill in the art may be utilized to provide oxygen or oxygen-enriched air for synthesis gas conversion unit 330. In embodiments, an air separation unit is selected from cryogenic distillation columns, vacuum swing adsorbers (VSA's), pressure swing adsorbers (PSA's) and membranes. Oxygen or oxygen-enriched air separated from air introduced into air separation unit 320 via air inlet line 301 is introduced into synthesis gas conversion unit 330 via line 302. A line 350A may fluidly connect air separation apparatus 320 with gasification apparatus 200 such that oxygen-reduced air, which may comprise primarily nitrogen, exiting air separation apparatus 320 may be introduced into gasification apparatus 200 as fluidization gas for a fluidized vessel thereof.

Synthesis gas conditioning apparatus 300' may further comprise quench apparatus 340 configured to cool or partially cool the conditioned syngas, and fluidly connected with synthesis gas conversion apparatus 330 via line 303. Synthesis gas conditioning apparatus 300' may further comprise heat recovery and/or water wash apparatus 360 configured for the recovery of heat from the synthesis gas. The synthesis gas may be introduced into heat recovery and/or water wash apparatus 360 via line 303 from synthesis gas conditioner 330 and/or via line 304 from quenching apparatus 340. Heat recovery apparatus 360 may be operable to produce steam via heat transfer from the relatively hot synthesis gas to BFW, said steam extracted from heat recovery apparatus 360 via steam outlet line 306, from boiler feed water (BFW) introduced thereto via BFW inlet line 305. In embodiments, the steam produced in heat recovery and/or wash apparatus 360 is a high pressure steam having a pressure of greater than about 450 psi (e.g., in the range of from about 450 psi to about 1,500 psi). In embodiments, the steam produced in heat recovery and/or wash apparatus 360 is a low pressure steam having a pressure of less than about 450 psi (e.g., in the range of from about 15 psi to about 450 psi). In embodiments, at least a portion 350B of the steam produced in heat recovery apparatus 360 is utilized as fluidization gas in gasification apparatus 200. In such embodiments, heat recovery apparatus 360 may be fluidly connected with a fluidized unit of gasification apparatus 200. Synthesis gas conditioning apparatus 300' may further comprise syngas compressor 370 configured to increase the pressure of the synthesis gas introduced thereto, for example, the reduced-temperature syngas introduced thereto via line 307 from heat recovery/water wash apparatus 360. Suitable compressors are well known in the art. In embodiments, synthesis gas conditioning apparatus 300' further comprises sulfur removal apparatus 380. Sulfur removal apparatus 380 is any apparatus known to those of skill in the art to be operable to extract sulfur and/or sulfur-containing contaminants from a synthesis gas introduced thereto, for example, via syngas compressor 370 and line 308. In embodiments, sulfur removal apparatus 380 is selected from SELEXOL™ and RECTISOL® units. In embodiments, synthesis gas conditioning apparatus 300' further comprises carbon dioxide removal apparatus 390. Carbon dioxide removal apparatus 390 is any apparatus known to those of skill in the art to be operable to extract carbon dioxide from a synthesis gas introduced thereto, for example, via syngas compressor 370 and line 308 and/or via sulfur removal apparatus 380 and line 309. In embodiments, carbon dioxide removal apparatus 390 is selected from SELEXOL™ and RECTISOL® units. In embodiments, sulfur removal apparatus 380 and carbon dioxide removal apparatus 390 are a single apparatus. For example, in embodiments, synthesis gas conditioning apparatus 300' comprises an acid gas removal unit or 'AGR' in place of sulfur removal apparatus 380 and carbon dioxide removal apparatus 390. The AGR unit may be selected from SELEXOL™ units and RECTISOL® units, in some embodiments. Removal of carbon dioxide via carbon dioxide removal apparatus 390 or a combined 380/390 AGR unit provides a low BTU, carbon dioxide-rich gas, which may be extracted therefrom via carbon dioxide-enriched gas line 350C. In embodiments, at least a portion of the carbon dioxide-rich gas exiting synthesis gas conditioning apparatus 300' via line 350C is recycled to gasification apparatus 200 for use as fluidization gas for a fluidized vessel thereof. Conditioned synthesis gas exits conditioning apparatus 300' via conditioned synthesis gas outlet line 310'.

In embodiments, conditioning comprises altering the composition of at least a portion of the gasification product gas with enriched air to produce an altered gasification product gas; quenching the altered gasification product gas; recovering heat from the quenched, altered gasification product gas to provide a lower temperature gasification product gas; compressing the lower temperature gasification product gas; and/or removing sulfur and/or carbon dioxide from the compressed lower temperature gasification product gas to provide conditioned synthesis gas for downstream utilization in synthesis gas utilization apparatus 400. As mentioned hereinabove, as known in the art, recovering heat during conditioning may provide a steam (e.g., a high or low pressure steam), providing oxygen or oxygen-enriched air may produce an oxygen-reduced tailgas, and carbon dioxide and/or sulfur removal may provide a carbon dioxide-rich fuel gas. In such embodiments, one or more recycle lines 350 (350A, 350B, and/or 350C in FIG. 4) from syngas conditioning apparatus 300' may be incorporated into the system to recycle at least a portion of a high pressure steam, an air separation unit tailgas, and/or a carbon dioxide-rich fuel gas as fluidization gas in gasification apparatus 200.

Referring again now to FIG. 1, at least a portion of conditioned synthesis gas 310 is introduced into synthesis gas utilization apparatus 400. Synthesis gas utilization apparatus 400 can be any apparatus known in the art to be suitable for the production of a valuable product from synthesis gas. For example, synthesis gas utilization apparatus 400 may comprise Fischer-Tropsch synthesis apparatus, hydrogen recovery apparatus, power production apparatus, boilers (e.g., wherein the synthesis gas may be utilized as fuel), apparatus configured for the production of non-Fischer-Tropsch chemicals from synthesis gas, associated equipment (such as Fischer-Tropsch product upgrading equipment, wastewater cleanup apparatus, and component separators), or a combination thereof. In embodiments, a gas utilized or produced in synthesis gas utilization apparatus 400 is recycled via one or more recycle lines 450 to gasification apparatus 200 for utilization as a fluidization gas for a fluidized unit thereof.

In the embodiment of FIG. 2, the synthesis gas utilization apparatus comprises Fischer-Tropsch synthesis apparatus 420, Fischer-Tropsch product upgrading apparatus 480, separator 460, Fischer-Tropsch tailgas stripper 430, steam stripper 440, and hydrogen recovery apparatus 470. A system according to this disclosure may comprise none, one, or a combination of any two or more of the synthesis gas utilization apparatus depicted in FIG. 2.

Fischer-Tropsch synthesis apparatus 420 is configured to produce Fischer-Tropsch hydrocarbons via catalytic conversion of synthesis gas. The Fischer-Tropsch synthesis apparatus 420 comprises at least one Fischer-Tropsch synthesis reactor. The Fischer-Tropsch synthesis reactor may be any suitable Fischer-Tropsch reactor known in the art. In embodiments, the Fischer-Tropsch synthesis reactor is operable with an iron-based catalyst. In embodiments, the Fischer-Tropsch synthesis reactor is operable with a cobalt-based catalyst. In embodiments, the catalyst is a precipitated iron catalyst. In embodiments, the precipitated Fischer-Tropsch catalyst is an iron-based catalyst formed as described in or having the composition of Fischer-Tropsch catalyst described in U.S. Pat. No. 5,504,118 and/or U.S. patent application Ser. No. 12/189,424 (now U.S. Pat. No. 7,879,756); Ser. Nos. 12/198,459; 12/207,859; (now U.S. Pat. No. 9,018,128); Ser. Nos. 12/474,552; and/or 12/790,101, (now U.S. Pat. No. 8,791,041), the disclosure of each of which is hereby incorporated herein in its entirety for all purposes not contrary to this disclosure.

Operation of Fischer-Tropsch synthesis apparatus 420 produces Fischer-Tropsch products, which are extracted from FT synthesis apparatus 420 via FT product outlet line 404, and a Fischer-Tropsch tailgas, which is extracted from Fischer-Tropsch synthesis apparatus 420 via FT tailgas outlet line 401. The FT products are generally liquids at the operating temperature of the Fischer-Tropsch reactor. The liquid Fischer-Tropsch products may comprise primarily hydrocarbons. The liquid Fischer-Tropsch products may comprise primarily long-chain aliphatic hydrocarbons.

In embodiments, at least a portion of FT tailgas extracted from FT synthesis apparatus 420 via FT tailgas line 401 is recycled via line 450A to gasification apparatus 200 for utilization as fluidization gas for a fluidized unit thereof. In embodiments, one or more component is removed from at least a portion of the FT tailgas prior to utilization thereof as fluidization gas. For example, in the embodiment of FIG. 2, at least a portion of the FT tailgas in line 401 is introduced via line 402 into a separation unit 460 configured to remove at least one component from the FT tailgas introduced thereto. For example, separation unit 460 may be a carbon dioxide separation unit, such as a carbon dioxide removal membrane, as known in the art. In such embodiments, a carbon dioxide-rich gas (which is generally a low BTU gas) may be introduced, via line 450B, into gasification apparatus 200 for use therein as a fluidization gas. A $CO_2$-reduced FT tailgas may exit separator 460 via line 413. The carbon dioxide-reduced FT tailgas, which may comprise hydrogen and carbon monoxide, may be utilized elsewhere in system II. For example, in embodiments, carbon dioxide-reduced FT tailgas 413, or a portion thereof, is reintroduced into FT synthesis apparatus 420 for the production of additional FT synthesis products therefrom. Recycle of FT tailgas to gasification apparatus 200 (e.g., as fluidization gas thereof; to the fluidized bed or a gasifier freeboard) may result in increased production of hydrogen and carbon monoxide and/or maintenance of a desired gasifier product gas (i.e. synthesis gas) composition. In applications in which gasification apparatus 200 comprises an entrained flow type gasifier, recycle of FT tailgas thereto may assist in providing the gas velocity necessary to entrain solids circulating about the gasifier. Utilization of FT tailgas recycle to a pyrolyzer may thus increase the syngas production from and/or reduce the steam consumption of a pyrolyzer.

Production of Fischer-Tropsch synthesis products in Fischer-Tropsch synthesis apparatus 420 may concomitantly produce a Fischer-Tropsch wastewater 405 that must be disposed of appropriately. The FT wastewater may contain a significant amount of oxygenates and/or other chemical compounds (which may be referred to hereinafter simply as 'oxygenates') which mandate challenging wastewater treatment to make the wastewater suitable for discharge. In embodiments, at least a portion of the FT tailgas exiting FT synthesis apparatus 420 via FT tailgas line 401 is utilized to strip oxygenates from at least a portion of the Fischer-Tropsch wastewater exiting FT synthesis apparatus 420 via FT wastewater exit line 405. Such oxygenate stripping may be operable prior to introduction of the FT tailgas as fluidization gas into gasification apparatus 200. As indicated in the embodiment of FIG. 2, a portion of the FT tailgas may be introduced via a line 403, along with at least a portion of the FT wastewater via a line 406, into FT tailgas stripper or saturator column 430. The FT wastewater may be utilized as makeup stream for stripper 430. Stripper 430 is configured to contact the FT tailgas introduced thereto with the FT wastewater introduced thereto, whereby oxygenates and optionally other contaminants in the FT wastewater are stripped by the FT tailgas. A line 450C is configured to extract oxygenate-enriched FT tailgas from FT tailgas stripper 430 (also referred to herein as 'FT tailgas saturator 430'), and a line 408 is configured to extract oxygenate-reduced FT wastewater from stripper 430. In embodiments, at least a portion of the oxygenate-enriched FT tailgas is introduced via recycle line 450C into gasification apparatus 200 for utilization therein as a fluidization gas. In this manner, an amount of (e.g., most of or substantially all of) the oxygenates may be stripped from the FT wastewater introduced into stripper 430, and purge stream 408 from saturator 430 can contain more pure (e.g., substantially pure) water, which may be disposed of more easily than the dirty FT wastewater introduced thereto via line 406, and/or which may be utilized elsewhere. By utilization of the oxygenated FT tailgas as fluidization gas in gasification apparatus 200, oxygenates recovered in the FT tailgas may be gasified to produce additional synthesis gas, and/or the amount of steam utilized for fluidization may be reduced. Thus, FT wastewater stripping with FT tailgas may increase syngas production from the gasification apparatus, and/or may reduce water treatment requirements in the system.

Stream 205 may comprise live steam available for use as a portion of a fluidization gas utilized in gasification apparatus 200. In embodiments, at least a portion of the Fischer-Tropsch wastewater produced during FT synthesis in Fischer-Tropsch synthesis apparatus 420 and exiting therefrom via FT wastewater line 405 is introduced via line 407 into a steam stripper 440 along with steam. The steam introduced into steam stripper 440 via steam line 206 may be at least a portion of the steam in a fluidization line 205. Steam stripper 440, which may be a trayed or packed column as known in the art, is configured to contact the FT wastewater introduced thereto via line 407 with steam introduced thereto via line 206, whereby oxygenates and optionally other contaminants in the FT wastewater are stripped by the steam. A line 450D is configured to extract oxygenate-enriched steam from steam stripper 440 and a line 409 is configured to extract oxygenate-reduced FT wastewater from stripper 440. In embodiments, at least a portion of the oxygenate-enriched steam is introduced via recycle line 450D into gasification apparatus 200 for utilization therein as a fluidization gas. In this manner, an amount of (e.g., most of or substantially all of) the oxygenates may be stripped from the FT wastewater introduced into steam stripper 440, and the purge stream exiting steam stripper 440 via line 409 can contain more pure (e.g., substantially pure) water, which may be disposed of more easily than the dirty FT wastewater, and/or which may be utilized elsewhere. By utilization as fluidization gas in gasification apparatus 200 of the steam stripper overhead vapors, which may contain a substantial amount (e.g., a majority) of the oxygenates present in the dirty FT wastewater introduced thereto via line 407, oxygenates recovered in the 'dirty' steam may be gasified to produce additional synthesis gas. Thus, FT wastewater stripping with steam may increase syngas production from gasification apparatus 200, and/or may reduce water treatment requirements in the system.

It is also noted herein that, in embodiments, at least a portion of the FT tailgas may be recycled to the feedstock preparation apparatus for utilization as a carrier to pneumatically convey the solid feedstock to the gasification apparatus, may be recycled to the feedstock preparation apparatus or the gasification apparatus to be utilized to provide purge gas to instrument taps and/or other process connections in the gasification apparatus, may be recycled to the synthesis gas conversion apparatus 330 of a synthesis gas conditioning apparatus 300/300' in order to reform the gaseous components thereof, thus increasing the amount of hydrogen and carbon monoxide in the conditioned synthesis gas and/or maintain a desired composition thereof, and/or may be recycled to a quench apparatus 340 of a synthesis gas conditioning apparatus such as 300' in order to cool the hot gas exiting a syngas conversion apparatus 330 (e.g., to a temperature below which ash particles and/or aerosols present therein will not adhere to heat transfer and/or other downstream apparatus).

In embodiments, synthesis gas utilization apparatus 400 comprises hydrogen recovery apparatus. For example, the system may be utilized to provide hydrogen for downstream syngas utilization apparatus comprising a fuel cell, or to provide hydrogen for use in product upgrading comprising hydrotreatment (e.g., hydroisomerization, hydrocracking, hydrodesulfurization, hydrodenitrogenation, etc.). System II of FIG. 2 comprises hydrogen recovery apparatus 470 fluidly connected with synthesis gas conditioning apparatus 300 and configured to separate hydrogen from at least a portion of the conditioned synthesis gas exiting synthesis gas conditioning apparatus 300 via conditioned synthesis gas outlet line 310. Hydrogen recovery apparatus 470 provides a hydrogen-rich product, that exits hydrogen separation apparatus 470 via hydrogen-rich product outlet line 411, and a hydrogen-reduced product, that exits hydrogen recovery apparatus 470 via line 450E. In embodiments, line 450E fluidly connects hydrogen recovery apparatus 470 with gasification apparatus 200, whereby at least a portion of the hydrogen-reduced gas exiting hydrogen recovery apparatus 470 may be utilized as fluidization gas in gasification apparatus 200. Hydrogen recovery apparatus 470 can comprise any hydrogen separation apparatus known in the art. In embodiments, hydrogen recovery apparatus 470 comprises a hydrogen separation membrane. In embodiments, hydrogen recovery apparatus 470 comprises a PSA unit. Line 411 may be fluidly connected with a product upgrading apparatus (a description of an example of which is to follow), whereby at least a portion of the recovered hydrogen may be utilized in downstream product upgrading operations/apparatus.

In embodiments, synthesis gas utilization apparatus 400 comprises Fischer-Tropsch product upgrading apparatus 480. Fischer-Tropsch product upgrading apparatus may be any suitable apparatus known in the art to convert the products of Fischer-Tropsch synthesis into other (e.g., more desirable) products. For example, product upgrading apparatus 480 may comprise one or more units selected from hydrocrackers, hydroisomerization units, hydrodesulfurizers, hydrodenitrogenators, fractionators such as distillation columns, and the like. In embodiments, product upgrading apparatus 480 operates via contact of at least a portion of the Fischer-Tropsch synthesis products produced in FT synthesis apparatus 420 with hydrogen, which may be introduced thereto via a line 412. The product upgrading may be catalytic in nature. In embodiments, a hydrogen recovery apparatus 470 is fluidly connected with product upgrader 480 via line 411, whereby at least a portion of the hydrogen separated in hydrogen recovery apparatus 470 is utilized in product upgrader 480. Lines 411 and 412 may be the same line, in embodiments. A line 410 is configured to extract upgraded Fischer-Tropsch product from product upgrader 480. The upgraded product may comprise primarily jet fuel, primarily diesel fuel, primarily gasoline, primarily naphtha, or some combination of one or more FT product selected from jet fuel, diesel fuel, gasoline, and naphtha.

Upgrading may create an upgrader offgas, removable from product upgrading apparatus 480 via line 414. A recycle line 450F may fluidly connect product upgrader 480 with gasification apparatus 200, whereby at least a portion of the product upgrader tailgas may be utilized as fluidization gas for a fluidized component thereof (e.g., a CSP, a GSP, a combustor, and/or a pyrolyzer thereof). In embodiments, at least a portion of the product upgrader tailgas is utilized as fuel for a combustor of a DFB indirect gasification apparatus, such as DFB indirect gasification apparatus 200' of FIG. 3.

Dual Fluidized Bed (DFB) Indirect Gasifier Suitable for Use as Gasification Apparatus. As mentioned hereinabove, a system according to this disclosure comprises gasification apparatus 200 comprising at least one component operable as a fluidized bed. Gasification apparatus 200 comprises any fluidized bed gasifier known to those of skill in the art. In embodiments, gasification apparatus 200 comprises a dual fluidized bed gasifier. In embodiments, gasification apparatus 200 comprises a dual fluidized bed gasifier as described in U.S. Pat. No. 8,241,523. A suitable dual fluidized bed gasifier for use in a system according to embodiments of this disclosure will now be described with reference to FIG. 3, which depicts a dual fluidized bed gasifier 200', and suitable feed preparation apparatus 100'.

A suitable DFB indirect gasifier 200' may be operable by introducing inlet gas at a low gas velocity to fluidize a high average density bed in a gasifier/pyrolysis vessel. The high average density bed may comprise a relatively dense fluidized bed in a lower region thereof, the relatively dense fluidized bed containing a circulating heated relatively fine and inert particulate heat transfer material. Carbonaceous material may be introduced into the lower region at a relatively high rate and endothermal pyrolysis of the carbonaceous material accomplished by means of a circulating heated inert material, producing a gasifier product gas comprising synthesis gas (i.e. comprising hydrogen and carbon monoxide). In embodiments, in an upper region of the pyrolyzer is a lower average density entrained space region containing an entrained mixture comprising inert solid, particulate heat transfer material, char, unreacted carbonaceous material and product gas. The entrained mixture is removed from the gasifier to one or more separators, such as a cyclone, wherein solids (heat transfer particles, char and/or unreacted carbonaceous material) are separated from the gasification product gas. At least a portion of the removed solids is returned to the pyrolyzer via heat transfer return line after reheating to a desired temperature via passage through an exothermic reaction zone of an external combustor.

DFB indirect gasification apparatus 200' comprises gasifier 20 (also referred to herein as 'pyrolyzer 20') that is fluidly connected with a combustor 30, whereby heat lost during endothermic gasification in gasifier/pyrolyzer 20 can be supplied via exothermic combustion in combustor 30, as discussed further hereinbelow. DFB indirect gasifier 200' may further comprise at least one combustor seal pot 70 and at least one gasifier seal pot 80 or other sealing devices such as one or more 'J' or 'L' valves. Pyrolyzer 20 is operable for removal therefrom of a circulating particulate phase and char by entrainment in gasifier product gas. Separation of solid, entrained particulates comprising particulate heat transfer material and char from the gasification product gas, can be accomplished by gas/solid separators, such as conventional cyclone(s). In embodiments, substantially all system solids are elutriated despite the use of what are generally considered to be low inlet gasifier fluidization gas velocities. The DFB indirect gasifier may thus further comprise one or more gasifier particulate separator (e.g., one or more gasifier cyclones) and one or more combustor particulate separator (e.g., one or more combustor cyclones). In the embodiment of FIG. 3, DFB indirect gasifier 200' comprises primary gasifier cyclone(s) 40 and secondary gasifier cyclone(s) 50 and combustor cyclone(s) 60. Each of these components will be discussed in more detail hereinbelow.

Circulating between the gasifier and the combustor via heat transfer lines 25 and 35 is a heat transfer material (HTM). The heat transfer material is a substantially inert (i.e. substantially inert relative to the carbonaceous feed material being gasified) material that may have some tar-reducing catalytic properties, depending on the material selected. In embodiments, the heat transfer material is selected from the group consisting of sand, limestone, and other calcites or oxides such as iron oxide, olivine, magnesia (MgO), attrition resistant alumina, carbides, silica aluminas, attrition resistant zeolites, and combinations thereof. The heat transfer material is heated by passage through an exothermic reaction zone of an external combustor. In embodiments, the heat transfer material may participate as a reactant or catalytic agent, thus 'relatively inert' as used herein with reference to the heat transfer material is as a comparison to the carbonaceous materials and is not used herein in a strict sense. For example, in coal gasification, limestone may serve as a means for capturing sulfur to reduce sulfate emissions. Similarly, limestone may serve to catalytically crack tar in the gasifier. In embodiments, the gasifier may be considered a catalytic gasifier, and a catalyst may be introduced with or as a component of the particulate heat transfer material.

The heat transfer material may have an average particle size in the range of from about 1 μm to about 10 mm, from about 1 μm to about 1 mm, from about 5 μm to about 700 μm, or from about 5 μm to about 300 μm. The heat transfer material may have an average density in the range of from about 50 lb/ft³ (0.8 g/cm³) to about 500 lb/ft³ (8 g/cm³), from about 50 lb/ft³ (0.8 g/cm³) to about 300 lb/ft³ (4.8 g/cm³), or from about 100 lb/ft³ (1.6 g/cm³) to about 300 lb/ft³ (4.8 g/cm³).

As noted previously, gasification apparatus 200' comprises a combustor configured to heat the heat transfer material separated via one or more separators (e.g., cyclones) from the gasification product comprising entrained materials extracted from the pyrolyzer. The combustor may be any type of combustor known in the art, such as, but without limitation, fluidized, entrained, and non-fluidized combustors. Combustor 30 may be associated with a combustor seal pot (CSP) 70, or other sealing devices such as a 'J' or 'L' valves, configured to prevent backflow of materials into the gasifier cyclone(s) 40, 50 configured to remove particulate from the gasifier product gas; and/or gasifier 20 may be associated with a gasifier seal pot (GSP) 80, or other sealing devices such as a 'J' or 'L' valves, configured to prevent backflow of materials into the combustor cyclone(s) 60 configured to remove particulates from the combustor flue gas.

Combustor 30 may be configured for operation with supplemental fuel (in addition to the char carried over from gasifier 20) being introduced thereto, as indicated via line 8 in FIG. 3. The supplemental fuel may be introduced into the combustor 30 at any suitable location, including, but not limited to, the HTM inlet line 35 or combustion air line(s) 201B. For example, when the supplemental fuel is a gas (e.g., combustion air comprising light tars), the supplemental fuel may be introduced into combustor 30 along with combustion air (for example, via line 201B in FIG. 3). In embodiments, the supplemental fuel is introduced indirectly into combustor 30, for example, via introduction into an air preheater (e.g., a direct fired air preheater) upstream of combustor 30. In embodiments, the supplemental fuel may comprise primarily liquids or gas. In embodiments, the supplemental fuel comprises or is primarily a solid. In such embodiments, the supplemental fuel may be introduced by combination with heat transfer material. For example, the supplemental fuel, optionally combined with makeup sand in lines 9, 9a and/or 9b, may be introduced into combustor 30 directly or via combustor separator(s) 60 or gasifier seal pot 80. In embodiments, the supplemental fuel is introduced into combustor 30 via make-up sand inlet line 9a. In embodiments, the DFB indirect gasifier comprises a pump/compressor (e.g., a positive displacement pump) and fuel injector nozzles configured for introducing supplemental fuels into combustor 30. Line 8 may be designed to inject liquid, gaseous and/or solid fuel sources directly into combustor 30.

The supplemental fuel provides additional energy to heat the circulating heat transfer media. The supplemental fuels may be carbonaceous or non-carbonaceous waste streams and may comprise or be primarily gaseous, liquid, and/or solid. Any 'waste' stream containing hydrocarbons (e.g., any stream having BTU value) may be utilized as supplemental fuel to the combustor (and/or, in embodiments, may be utilized for the production of additional synthesis gas/increase in conversion of feed to product syngas via introduction into the pyrolyzer 20 of the DFB indirect gasifier 200'). For example, it is envisaged that, in embodiments, waste materials such as, but not limited to, used car oil, animal (e.g., chicken) fat, cooking grease, etc., may be utilized to provide supplemental fuel to the combustor.

The supplemental fuel for the combustor may be produced within gasification apparatus 200/200', via upstream process unit(s), such as feed preparation apparatus 100/100', via downstream process unit(s), such as synthesis gas conditioning apparatus 300, synthesis gas utilization apparatus 400, or via some combination thereof. Utilization of a 'waste' stream as a supplemental fuel for the combustor of the DFB indirect gasifier may improve the overall efficiency of the gasification system, increasing the amount of synthesis gas produced, and/or providing a more desirable synthesis gas (e.g., having a desired molar ratio of hydrogen to carbon monoxide), potentially along with reducing the quantity of waste effluent and/or emissions (e.g., hydrocarbon-containing waste material) that must be handled. As disposal of hydrocarbon-containing waste streams can be costly and time consuming, utilization of a 'waste' stream as supplemental fuel for the combustor may enable reduction in operating expenses along with enhanced overall unit efficiency and/or synthesis gas production.

At least a portion of a supplemental fuel introduced into combustor 30 via supplemental fuel line 8 may be a hydrocarbon-containing material produced via an upstream unit(s). In such embodiments, the upstream unit(s) may be fluidly connected with combustor 30, via line 8, for example, such that the hydrocarbon-containing material exiting the upstream process unit(s) may be utilized as supplemental fuel for combustor 30. For example, feed preparation apparatus 100/100' may comprise a dryer configured to dry a gasifier feed material (as discussed hereinabove). Such drying may produce a dryer vent stream comprising, for example, substantial VOC's. A portion or all of the dryer vent gas comprising hydrocarbons may be utilized as supplemental fuel for combustor 30.

In embodiments, the gasifier feed comprises a substantial moisture content, as discussed further hereinbelow. For example, the biomass feed may comprise a 'wet' biomass. The synthesis gas may be intended for downstream processing in syngas utilization apparatus comprising Fischer-Tropsch synthesis. Conditioning of synthesis gas may be utilized to provide a suitable synthesis gas for downstream utilization in the production of Fischer-Tropsch hydrocarbons. It may be desirable, in such embodiments, to provide a low moisture synthesis gas to such conditioning processes/apparatus. In such embodiments, drying of the gasifier feedstock (e.g., of a biomass feedstock) may be desirable in order to control the moisture content of the resulting product synthesis gas. The feedstock dryer may be operable to provide an ultra-low level of $H_2O$ (e.g., 0 weight percent to 30 wt. %, 10 wt. % to 30 wt. %, 15 wt. % to 30 wt. %, or even substantially 0 wt %, for example, with torrefaction) in the synthesis gas, suitable for subsequent downstream conditioning. As mentioned hereinabove, in embodiments, feed preparation apparatus 100/100' comprises a dryer that produces a waste product gas suitable for use as supplemental fuel in combustor 30. The waste gas from the dryer may contain volatile organic compounds (VOC's). In embodiments, the waste gas comprises from about 0.01 to about 10 volume percent VOC's, from about 0.05 to about 5 volume percent VOC's, or from about 0.1 to about 1 volume percent VOC's. The VOC-containing dryer vent gas may be condensed, and soluble VOC's absorbed, for example in water. In such embodiments, the non-condensable gas containing VOC's may be utilized as supplemental fuel for combustor 30, as alternate fluidization gas for a fluidized component of gasification apparatus 200/200', or both. Such utilization may reduce environmental emissions.

In embodiments, at least a portion of the supplemental fuel for combustor 30 is produced via one or more downstream unit(s) 300/400. In such embodiments, the downstream unit(s) may be fluidly connected with combustor 30 directly, or via line 8, for example, such that a hydrocarbon-containing material exiting the downstream process unit(s) may be utilized as supplemental fuel for combustor 30. In embodiments, a hydrocarbon-laden stream produced downstream of the DFB indirect gasifier (e.g., tar that is recovered from a downstream tar removal system) is introduced into the combustor for recovery of the heating value thereof. The tar may be obtained from any tar removal apparatus known in the art, for example from a liquid absorber such as, but not limited to, an OLGA (e.g., a DAHLMAN OLGA) unit. Such removed tars comprise heavy hydrocarbons which may be reused as a component of feed/fuel to combustor 30. In embodiments, tailgas (e.g., Fischer-Tropsch tailgas, PSA tailgas, VSA tailgas and/or upgrader tailgas) is utilized as a fuel to the combustor. The supplemental fuel may be a low pressure waste gas, such as PSA offgas. As mentioned hereinabove, the fluid recycled as supplemental fuel to the combustor of the DFB indirect gasifier may comprise or be primarily liquid, gaseous, or solid. For example, the supplemental fuel may comprise a liquid tar-containing stream, and/or a fuel-enhanced combustion air (e.g., light tars stripped with combustion air).

In embodiments, a liquid feed such as, but not limited to, refinery tank bottoms, heavy fuel oil, liquid fuel oil (LFO), Fischer-Tropsch tar, spent catalyst/wax, natural gas and/or another material (e.g., low value hydrocarbon material) having a heating value, is introduced into the combustor. Nozzles may be positioned above the dipleg for introduction of such liquid material(s) into the combustor. This may help the liquid flow into the downleg and avoid production of cold spots on the refractory. In this manner, circulating heat transfer material may be utilized to circulate the liquid and the liquid may be carried into the combustor via the combustor fluidization gas (e.g., air).

A spent catalyst/wax stream comprising spent catalyst and Fischer-Tropsch hydrocarbons may be separated from the liquid products of downstream Fischer-Tropsch synthesis apparatus 420. At least a portion of the spent catalyst/wax may be recycled as supplemental fuel to a combustor 30 of a DFB indirect gasifier 200'. The spent Fischer-Tropsch wax (which may contain up to about 5, 10, 15, 20, 25, or 30 weight percent catalyst) may be introduced into the combustor (and/or the gasifier, as discussed further hereinbelow). In embodiments, Fischer-Tropsch wax is produced downstream, and spent Fischer-Tropsch wax is recycled as fuel to the combustor. As discussed further hereinbelow, such spent wax can alternatively or additionally also be introduced into the gasifier, providing that it will crack under the operating conditions therein. In embodiments, biomass, petcoke, and/or coal is fed to the combustor, as a fuel source. A potential benefit of introducing spent catalyst/wax into the DFB indirect gasifier is that, not only can the heating value of the wax be used to heat the heat transfer material, and/or the hydrocarbons be converted into additional synthesis gas product gas, but the introduction of the spent catalyst into the DFB indirect gasifier may allow for capture of the spent catalyst with the ash/via the ash recovery apparatus.

In embodiments, primarily air is fed into the bottom of combustor 30 and steam is fed into CSP 70. In embodiments, combustion air introduced into combustor 30 (for example, via line 201B) comprises oxygen-enriched air. The steam feed rate to CSP 70 may be about 4000 lb/h (for a plant operating at about 500 dry tons/day, for example). The steam passes through and exits combustor cyclone 60. The cyclone efficiency is dramatically affected by the superficial velocity thereto. The higher the superficial velocity, the better the cyclone efficiency. If the ACFM (actual cubic feet per minute) can be reduced, the cyclone size may be reduced and the solids capture efficiency may be improved (based on a higher solids loading and the typical, higher efficiency of smaller cyclones). Thus, in embodiments, air may be fed into CSP 70, rather than steam. In embodiments, 20-25% of the combustor fluidization gas (e.g., air and/or alternate fluidization gas described herein) required for combustor 30 is introduced directly into CSP 70 before entering combustor 30. In embodiments, combustion air and/or alternate fluidization gas described herein, rather than wholly steam, is fed into CSP 70, such that heat is not removed from combustor 30 due to the flow of steam therethrough, and the downstream combustor separator(s)/cyclone(s) 60 may be incrementally smaller in size. That is, the introduction of air and/or alternate fluidization gas described herein (e.g., air at about 1000° F.), rather than the introduction of (e.g., 550° F.) steam alone into CSP 70 (which is heated therein to, for example, about 1800° F.) may serve to reduce the amount of steam in the gasification system. This may allow the downstream vessel(s) to be smaller. When air is introduced into CSP 70, partial combustion of char may occur in the seal pot with air (rather than steam), and the downstream combustor cyclone 60 and/or gasifier 20 may be smaller. Accordingly, in embodiments the combustor is reduced in size by introduction of combustion air as fluidization gas into CSP 70. For example, if the desired fluidization velocity at the top (e.g., proximate the flue gas exit) of the combustor is 30-35 ft/s, only about 75-80% (i.e. about 20 feet/s) may need to be introduced into the bottom of the combustor because 20-25% of the fluidization gas may be introduced into or via the CSP. Substituting the fluidization steam into CSP 70 with a portion of the combustion air may result in a smaller flowrate of flue gas leaving combustor 30; thus, the combustor inside diameter may be reduced. Another benefit of introducing combustor fluidization gas via the CSP is that the combustor cyclone(s) can be incrementally smaller or be operated more efficiently. Also, nitrogen in the air can be heated and thermal efficiency gained by eliminating or reducing the need for superheating steam (e.g., at 4000 lb/h of steam). (When steam is utilized, it may be a virtually complete loss of the steam. Very little heat may be recoverable therefrom, although the steam may flow through a downstream heat exchanger on, for example, the flue gas line.) When air is utilized as alternate fluidization gas for the combustor seal pot, part of the combustion process may occur in the combustor seal pot, with the remaining combustion occurring in the combustor, without increasing the total amount of air required for the combustion. Substitution of combustion air for steam as combustor seal pot fluidization gas provides savings (e.g., reduced steam production requirements such as boiler blowdown, chemicals, boiler feed water, etc.), may increase unit efficiency by reducing or eliminating heat losses due to heating of the fluidization steam in the combustor loop, and may provide for transfer of a hotter heat transfer media to pyrolyzer 20.

In embodiments, the fluidization gas for one or more of the gasifier 20, the gasifier seal pot 80, the combustor seal pot 70, and the combustor 30 comprises LP fuel gas. The LP fuel gas may have a pressure of less than 25, 50, or 100 psig, and/or a pressure in the range of from about 25 to about 100 psig. The fluidization gas in combustor 30 may comprise primarily air. The gas feed rate to the combustor may be greater than, less than, or equal to about 10, 15, 20, 25, 30, or 35 feet/s in certain embodiments.

The slope from combustor seal pot 70 into combustor 30 may provide an angle α, such that the heat transfer media (e.g., sand), air and flue gas will flow over and back into the combustor. The inlet flow of fluidization gas into the combustor may be determined by the heat transfer material. The inlet fluidization velocity is at least that amount sufficient to fluidize the heat transfer media within combustor 30. In embodiments, the inlet velocity to the combustor is greater than or about 10, 15, 20, 25, or 30 ft/s. In embodiments, the inlet velocity of fluidization gas into the bottom of the combustor is in the range of from about 15 to about 35 ft/s, from about 20 to about 35 ft/s, or from about 20 to about 30 ft/s. At higher elevations in the combustor, flue gas is created. This limits the suitable rate for introduction of fluidization gas into the combustor.

In embodiments, the combustor is operated in entrained flow mode. In embodiments, the combustor is operated in transport bed mode. In embodiments, the combustor is operated in choke flow mode. The bottom of the combustor (for example, at or near the inlet of circulating heat transfer media from the gasifier) may be operated at approximately 1100° F., 1200° F., 1300° F., 1400° F., 1500° F., or 1600° F., and the exit of the combustor (at or near the top thereof; for example, at or near the exit of materials to cyclone(s)) may be operated at approximately 1400° F., 1500° F., 1600° F., 1700° F., 1800° F., 1900° F., or 2000° F. Thus, the actual cubic feet of gas present increases with elevation in the combustor (due to combustion of the char and/or supplemental fuel). In embodiments, excess air flow is returned to the combustor.

The fluidization gas for the combustor may be or may comprise oxygen in air (e.g., 20 volume percent), oxygen-enriched air (e.g., 90 volume percent), or substantially pure oxygen (e.g., greater than 99, 99.5, 99.9, 99.99, or 99.99 volume percent oxygen), for example, from a vacuum swing adsorption unit (VSA) or a pressure swing adsorption unit (PSA), oxygen from a cryogenic distillation unit, oxygen from a pipeline, or a combination thereof. As mentioned hereinabove, oxygen-reduced tailgas from such an air separation unit may be utilized as alternate fluidization gas for pyrolyzer 20, CSP 70, GSP 80, or a combination thereof. The use of oxygen or oxygen-enriched air as combustor fluidization gas may allow for a reduction in vessel size, however, the ash fusion temperature must be considered. The higher the $O_2$ concentration in the combustor feed, the higher the temperature of combustion. The oxygen concentration should be kept at a value which ensures a combustion temperature less than the ash fusion temperature of the feed. Thus, the maximum oxygen concentration fed into the combustor can be selected by determining the ash fusion temperature of the specific feed utilized. In embodiments, the fluidization gas fed to the bottom of the combustor comprises from about 20 to about 100 mole percent oxygen. In embodiments, the fluidization gas comprises about 20 mole percent oxygen (e.g., air). In embodiments, the combustor fluidization gas comprises substantially pure oxygen (limited by the ash fusion properties of the char, supplemental fuel and heat transfer material fed thereto). In embodiments, the combustor fluidization gas comprises PSA tailgas.

The combustor may be designed for operation with about 10 volume percent excess oxygen in the combustion offgas. In embodiments, the combustor is operable with excess oxygen in the range of from about 0 to about 20 volume percent, from about 1 to about 14 volume percent, or from about 2 to about 10 volume percent excess $O_2$. In embodiments, the amount of excess $O_2$ fed to the combustor is greater than 1 volume percent and/or less than 14 volume percent. Desirably, enough excess air is provided such that complete combustion is assured and partial oxidation mode is avoided. In embodiments, the DFB indirect gasification system is operable with excess $O_2$ to the combustor in the range of greater than 1 to less than 10, and the flue gas comprises less than 15, 10, or 7 ppm CO. In embodiments, oxygen is utilized to produce more steam. In embodiments, for example, when the hot flue gas will be introduced into a second combustor (for example, without limitation, into the combustor of a second dual fluidized bed (DFB) gasifier as disclosed, for example, in U.S. patent application Ser. No. 12/691,297 filed Jan. 21, 2010 (and now U.S. Pat. No. 8,241,523), the disclosure of which is hereby incorporated herein for all purposes not contrary to this disclosure), the amount of excess oxygen may be in the range of from about 5 to about 25 percent, or may be greater than about 5, 10, 15, 20, or 25%, providing oxygen for a downstream combustor. In embodiments in which steam may be sold at value, more excess $O_2$ may be utilized to produce more steam for sale/use. In embodiments, a CO-rich, nitrogen-rich flue gas is produced by operation of combustor 30 of the herein disclosed DFB indirect gasification system at excess oxygen of greater than 7, 10 or 15%.

In embodiments, the combustor is pressurized. The combustor may be operable at a pressure of greater than 0 psig to a pressure that is at least 2 psig less than the operating pressure of the gasifier. That is, in order to maintain continuous flow of materials from the combustor back into the gasifier, the pressure of the combustor, $P_C$, at the inlet to the combustor which may be measured by a pressure gauge located proximate the flue gas exit, is less than the gasifier/pyrolyzer pressure, $P_G$. The pressure at the HTM outlet of the combustor, $P_{C,BOTTOM}$ (which must be greater than $P_G$), equals the sum of the pressure, $P_C$, at the top of the combustor and the head of pressure provided by the material in the combustor. The head of pressure provided by the heat transfer material/gas mixture within the combustor is equal to $\rho_C g h$, where $\rho_C$ is the average density of the material (e.g., the fluidized bed of heat transfer material) within the combustor, g is the gravitational acceleration, and h is the height of the 'bed' of material within the combustor. The height of material (e.g., heat transfer material such as sand, and other components such as char and etc.) within the combustor is adjusted to ensure flow of materials back to the gasifier.

Thus, $P_{C,BOTTOM}$ which equals $P_C + \rho_C g \Delta h$ must be greater than the pressure of the gasifier, $P_G$. The heights and relationships between the combustor and gasifier are selected such that adequate pressure is provided to maintain continuous flow from the combustor to the gasifier and back.

In embodiments, the operating pressure of the combustor, $P_C$, is up to or about 40, 45, 50, or 60 psig. In embodiments, based on 20-40 ft/s design criteria for gas velocity into the combustor, the maximum operating pressure of the combustor is about 45 psig. In embodiments, if the operating pressure of the combustor is increased, then the pressure energy can be recovered by the use of an expander. Thus, in embodiments, one or more expander is positioned downstream of the combustor gas outlet and upstream of heat recovery apparatus (discussed further hereinbelow). For example, when operated with pure oxygen, the diameter of the combustor may be smaller at the bottom than the top thereof. In embodiments, an expander is incorporated after the cyclones (because cyclone efficiency increases with higher pressures). In embodiments, one or more expander is positioned upstream of one or more baghouse filters, which may be desirably operated at lower pressures. In embodiments, the system comprises an expander downstream of one or more combustor cyclones. The expander may be operable at a pressure greater than 15, 20 or 30 psig. The one or more expanders may be operable to recover PV energy.

The superficial velocity selected for the gas/solid separators (which may be cyclones) may be selected to maximize efficiency and/or reduce erosion thereof. The cyclones may be operable at a superficial velocity in the range of from about 65 to about 120 feet/s, from about 65 to about 100 feet/s, from about 70 to about 85 feet/s, or at about 65, 70, 75, 80, 85, 90, 95, 100, 110 or 120 ft/s.

As shown in FIG. 3, the combustor outlet may be fluidly connected via line 31 with one or more HTM cyclones 60. The one or more cyclones may be configured in any arrangement, with any number of cyclones in series and/or in parallel. For example, a first bank of cyclones (e.g., from 1 to four or more cyclones) operated in parallel may be in series with a second bank of cyclones comprising from 1 to 4 or more cyclones in parallel and so on. The gasification apparatus can comprise any number of banks of cyclones.

The one or more combustion HTM cyclones may be connected with one or more ash cyclones, and the ash cyclones may be followed by heat recovery. In such embodiments, the cyclones are high temperature, refractory-lined or exotic material cyclones. In embodiments, the DFB indirect gasification system comprises two, three or four combustor separators in series. In embodiments, one to two banks of combustion HTM cyclones are followed by one or more banks of ash cyclones. In embodiments, two combustion HTM cyclones are followed by one or more than one combustor ash cyclone. The one or more HTM cyclone may have a performance specification of greater than 99, greater than 99.9 or greater than 99.98% removal of heat transfer material. Two or more combustor cyclones may be utilized to achieve the desired efficiency. In embodiments, the one or more ash cyclone may be operated to remove ash, for example, in order to reduce the size of a downstream baghouse(s). In embodiments, the one or more ash cyclones are operable to provide greater than about 60%, 70%, 80%, 85% or 90% ash removal from a gas introduced thereto.

In alternative embodiments, heat recovery apparatus is positioned between the HTM cyclone(s) and the ash removal cyclone(s). In such embodiments, combustor flue gas is introduced into one or more combustor HTM cyclones. The gas exiting the one or more HTM cyclones is introduced into one or more heat recovery apparatus. The gas exiting the one or more heat recovery apparatus is then introduced into one or more ash cyclones for removal of ash therefrom. The heat recovery apparatus may comprise one or more selected from the group consisting of air preheaters (e.g., a combustion air preheater), steam superheaters, waste heat recovery units (e.g., boilers), and economizers. In embodiments, heat recovery generates steam. In such embodiments comprising heat recovery upstream of ash removal, the one or more ash removal cyclones may not be refractory-lined, i.e. the one or more ash removal cyclones may be hard faced, but lower temperature cyclone(s) relative to systems comprising ash removal upstream of heat recovery. In embodiments, the ash removal cyclones are operable at temperatures of less than 400° F., less than 350° F., or less than 300° F. In embodiments, the lower temperature ash removal cyclones are fabricated of silicon carbide.

In embodiments, heat recovery is utilized to produce superheated steam. In embodiments, the superheated steam is produced at a temperature in the range of from about 250° F. to about 900° F., or from about 250° F. to about 400° F., and a pressure in the range of from about 100 psig to about 650 psig, or from about 100 psig to about 300 psig.

In embodiments comprising heat recovery upstream of ash recovery, the face of the tubes may be built up and/or the velocity reduced in downward flow in order to minimize erosion of heat recovery apparatus (e.g., heat transfer tubes). The velocity to the cyclones in such embodiments may be less than 80, 75, 70, or 65 ft/s. If the velocity is reduced appropriately, the ash will not stick to the heat recovery apparatus (e.g., to waste heat boiler tubes and/or the superheater tubes), and will not unacceptably erode same.

In embodiments, combustor flue gas is introduced directly or indirectly to the economizer of a boiler for recovery of heat and, for example, power production.

In embodiments, equilibrium is pushed toward the formation of hydrogen and carbon monoxide during pyrolysis via, for example, the incorporation of a material that effectively removes carbon dioxide. For example, NaOH may be introduced into the gasification apparatus 200' (e.g., to or with the heat transfer material, to gasifier 20, to combustor 30, or elsewhere) to produce $Na_2CO_3$, and/or CaO injection may be utilized to absorb $CO_2$, forming $CaCO_3$, which may later be separated into $CO_2$ and CaO which may be recycled into the system. The NaOH and/or CaO may be injected into gasifier or pyrolyzer 20. Addition of such carbon dioxide reducing material may serve to increase the amount of synthesis gas produced (and thus available for downstream processes such as, without limitation, Fischer-Tropsch synthesis and non-Fischer-Tropsch chemical and/or fuel production), and/or may serve to increase the Wobbe number of the gasifier product gas for downstream power production. Such or further additional materials may also be utilized to adjust the ash fusion temperature of the carbonaceous feed materials within the gasifier. As with the optional carbon dioxide reducing materials, such ash fusion adjustment material(s) may be incorporated via addition with or to the feed, with or to the heat transfer media, to gasifier 20, to combustor 30, and/or elsewhere. In embodiments, the additional material(s) are added with or to the feed to the gasifier. In embodiments, the additional material(s) are added with or to the heat transfer media.

Pyrolyzer 20 is a reactor comprising a fluid-bed of heat transfer material at the reactor base, and is operated at feed rates sufficiently high to generate enough gasifier product gas to promote circulation of heat transfer material and gasified char, for example, by entrainment. The gasifier may be a hybrid with an entrained zone above a fluidized bed gasifier, as described in U.S. Pat. No. 4,828,581, which is hereby incorporated herein by reference in its entirety for all purposes not contrary to this disclosure.

In embodiments, gasifier/pyrolyzer 20 is an annular shaped vessel comprising a conventional gas distribution plate near the bottom and comprising inlets for feed material(s), heat transfer material(s), and fluidizing gas. The gasifier vessel comprises an exit at or near the top thereof, and is fluidly connected thereby to one or more separators from which gasification product gas is discharged and solids are recycled to the bottom of the gasifier via an external, exothermic combustor operable to reheat the separated, heat transfer material. The gasifier operates with a recirculating particulate phase (heat transfer material), and at inlet gas velocities in the range sufficient to fluidize the heat transfer material, as further discussed hereinbelow.

Referring now to FIG. 3, the angle between the seal pot and the vessel (i.e. the angle $\alpha$ between the combustor seal pot 70 and the combustor 30, and/or the angle $\gamma$ between the gasifier seal pot 80 and the gasifier 20) may be in the range of from about 5 to about 90°, from about 5 to about 80°, or from about 5 to about 60°. In embodiments, $\alpha$ and/or $\gamma$ is less than 45°. Utilization of a higher angle generally results in a taller seal pot. Lower angles may be operable with the use of fluidization/aeration to maintain fluidization. Generally, for angles between 5 and about 45 degrees, fluidization/aeration may also be utilized. In embodiments, a lower angle, such as an angle of about 5 degrees, is utilized in the design so that the seal pot (CSP and/or GSP) is relatively short and the overall height of the unit (i.e. the stackup) may be reduced.

As indicated in the embodiment of FIG. 3, the inlets for feed and recirculating heat transfer material may be located at or near the base of gasifier 20, and/or may be proximate the pyrolyzer gas distributor. The feed may be selected from any carbonaceous sources, including, without limitation, the group consisting of biomass, RDF, MSW, sewage sludge, and combinations thereof. In embodiments, the feed comprises biomass. It is envisaged that coal may be added to the gasifier if it is suitable coal, and this depends on the ash fusion temperature. Refinery tank bottoms, heavy fuel oil, etc., which may, in embodiments, be contaminated with small solids, may be introduced into the gasifier and/or the combustor, so long as the ash fusion temperature therein is not adversely affected. In embodiments, petcoke is ground to a size in the range suitable to ensure volatilization within the pyrolyzer. In embodiments, petcoke is introduced into the pyrolyzer as a component of the carbonaceous feedstock. In embodiments, the gasifier feed further comprises Fischer-Tropsch synthesis products (e.g., Fischer-Tropsch wax) and/or spent catalyst (e.g., recycled spent catalyst in product wax). In embodiments, Fischer-Tropsch synthesis products are produced downstream and a portion of the Fischer-Tropsch product(s) (e.g., spent Fischer-Tropsch wax) that will crack under the operating conditions therein is recycled as feed/fuel to the gasifier.

The gasifier feed material may be introduced thereto via any suitable means known to one of skill in the art. The feed may be fed to the gasifier using a water cooled rotary screw. The feed may be substantially solid and may be fed utilizing a screw feeder or a ram system. In embodiments, the feed is introduced into the gasifier as primarily a solid. In embodiments, dual feed screws are utilized and operation is alternated therebetween, thus ensuring continuous feeding. In the embodiment of FIG. 3, feed preparation/introduction apparatus 100' comprises feed bin 101 (which may also serve as a dryer in some embodiments), feed handling screw 102, feed collection screw 103, valve (e.g., a knife and/or rotary valve) 104, and gasifier feed screw 107. Operation of such components is known in the art.

In embodiments, a feed bin 101 is configured for drying as well as storage, via utilization of residual heat from a low level heat source to partially dry a feed material for gasification apparatus 200. In this manner, traditional, dedicated feed drying methods and equipment may be replaced or reduced in extent or size. Suitable sources of low level heat include, but are not limited to, hot water, flue gas from a process source, such as a combustor, low level steam, and hot air from, for example, an air cooler. The source of the drying gas can be a combination of flue gas from a process source, such as the combustor section of a gasifier, atmospheric air that is heated with steam, and low level heat sources, such as discharge from a process heat exchanger (e.g., a fin fan) or hot oil/water cooling system. Such low level heat may also be utilized, in embodiments, to dry feed material in a day bin storage silo upstream of a gasifier feed bin 101. Thus, feed bin 101 may provide storage surge capacity for the gasifier feedstock, and be operable to at least partially dry the feedstock. Such a drying feed bin 101 may be operable to reduce the moisture content of a gasifier feed material from, for example, about 55 weight percent to about the mid to low 30 weight percent moisture range. More drying may be achieved by utilizing a hotter heat source and/or by increasing the residence time of the feed material in drying feed bin 101. Wet feedstock (e.g., wet biomass) may be introduced into the top of drying feed bin 101 via feed inlet line 105. A dust/particulate removal system may be utilized at the feed point into the bin. A dust/particulate removal system may be utilized to remove particulates from the drying gas stream exiting the feed bin. In embodiments, a bag house with cleaning provisions is utilized as dust/particulate removal system. An induced (ID) fan may be located at the entrance or exit of the baghouse to assist in meeting the flow requirements of the gas stream. The dryer vent gas may be sent to a stack or, as discussed herein, utilized as alternate fluidization gas, or split therebetween. Feed material may traverse the feed bin 101 counter-currently to the drying gas, and 'dry' feed material may exit feed bin 101 via an exit at the bottom thereof. Drying gas, e.g., combustor flue gas, may be introduced into a feed bin via lines 203 and/or 106 via nozzles on the sides and/or floor of the bin.

As indicated in FIG. 3, a gasifier feed inlet line 110 may be configured to provide an angle $\beta$ between the feed inlet line 110 and gasifier vessel 20. The feed inlet angle $\beta$ may be in the range of from about 5 to about 20 degrees, or from about 10 to about 15 degrees, such that the feed flows substantially uniformly into (i.e. across the cross section thereof) of pyrolyzer 20. In this manner, feed isn't limited to one side of the pyrolyzer, for example. A purge gas may also be introduced with the feed (for example, from a lockhopper) via the feed inlet to maintain a desired pressure, and/or to aid in feeding the feed to the pyrolyzer. In embodiments, the purge gas is selected from the group consisting of carbon dioxide, steam, fuel gas, nitrogen, synthesis gas, flue gas from the combustor, and combinations thereof. In embodiments, the purge gas comprises nitrogen. In embodiments, the feed is not purged. If $CO_2$ recovery is present, for example downstream in the system (e.g. via carbon dioxide removal apparatus 390, and/or carbon dioxide separator 460), it may be desirable for the feed purge gas to be or to comprise carbon dioxide.

In embodiments, the gasifier feed is pressurized. The carbonaceous feed material may be fed to the gasifier at a pressure in the range of from about 0 to about 40 psig. A dryer may be utilized to dry the feed and/or may be operated at a pressure, thus providing the feed material to the gasifier at a desired pressure and/or moisture content. The feed may be dried prior to introduction into the gasifier, and/or may be introduced hot (e.g., at a temperature of greater than room temperature). In embodiments, the feed is cold (e.g., at a temperature of equal to or less than room temperature). The feed may be introduced into the gasifier at a temperature in the range of from about −40 to about 260° F. In embodiments, the feed is at a temperature in the range of from −40 to about 250° F. In embodiments, the feed is at ambient temperature. In embodiments, the feed is at room temperature. In embodiments, a feed material is comminuted prior to introduction into the gasifier. In embodiments, a feed material is preheated and/or comminuted (e.g., chipped) prior to introduction into the gasifier.

In embodiments, feed preparation apparatus 100/100' is operable to provide a moisture content of the feed that is in the range of from about 5 weight percent to about 60 weight percent. In embodiments, feed preparation apparatus 100/100' provides a feed having a moisture content of greater than about 10, 20, 30, or 40 wt %. In embodiments, feed preparation apparatus 100/100' provides a feed having a moisture content of less than about 10, 20, 30, or 40 wt %. In embodiments, feed preparation apparatus 100/100' provides a feed having a moisture content that is in the range of from about 20 to about 30 wt %. In embodiments, feed preparation apparatus 100/100' provides a prepared feed having a moisture content that is in the range of from about 20 to about 25 wt %.

In embodiments, more drying of the feed material may be desired/utilized to provide syngas (via, for example, feed drying, gasification and/or partial oxidation) at a molar ratio of $H_2$/CO suitable for a desired downstream utilization in synthesis gas utilization apparatus 400. For example, in embodiments, syngas utilization apparatus 400 comprises Fischer-Tropsch synthesis apparatus 420 (as indicated in the embodiment of FIG. 2). If the FT synthesis is carried out in the presence of an iron catalyst (i.e. wherein a hydrogen to carbon monoxide molar ratio of about 1:1 is generally desirable), more drying may be desired. In embodiments, less drying may be desired/utilized, for example, to provide a synthesis gas having a molar ratio of $H_2$/CO suitable for downstream Fischer-Tropsch synthesis in the presence of a cobalt catalyst (i.e. wherein a hydrogen to carbon monoxide molar ratio of about 2 is generally desirable). As mentioned hereinabove, in embodiments, feed preparation apparatus 100/100' comprises a dryer configured to dry a 'wet' feed material (introduced thereto via line 105) prior to introduction into gasification apparatus 200. Any suitable dryer known in the art may be utilized to dry the feed material. Dried feed material may be introduced into a feed bin for introduction into gasification apparatus 200. As indicated in the embodiment of FIG. 2 and discussed hereinabove, a feed bin 101 may also serve as a dryer.

In embodiments, the feed rate (flux) of carbonaceous material to the pyrolyzer is greater than or equal to about 2000, 2500, 3000, 3400, 3500, lb/h/ft$^2$, 4000, or 4200 lb/h/ft$^2$. The design may allow for a superficial velocity at the outlet (top) of the pyrolyzer in the range of 15-45 ft/s (assuming a certain carbon conversion/volatilization/expansion). In embodiments, the carbon conversion is in the range of from about 0 to about 100%. In embodiments, the carbon conversion is in the range of from about 30 to about 80%. The pyrolyzer vessel size, i.e. the diameter thereof, may be selected based on a desired outlet velocity.

Gasifier fluidization gas may be fed to the bottom of pyrolyzer 20 (for example, via a distributor) at a superficial velocity in the range of from about 0.5 ft/s to about 10 ft/s, from about 0.8 ft/s to about 8 ft/s, or from about 0.8 ft/s to about 7 ft/s. In embodiments, the pyrolyzer fluidization gas (e.g., steam and/or alternate fluidization gas) inlet velocity is greater than, less than, or equal to about 1, 2, 3, 4, 5, 6, 7 or 8 ft/s. In embodiments, a gasifier fluidization gas superficial velocity of at least or about 5, 6, 7, or 8 ft/s is utilized during startup.

As discussed in detail hereinabove, the fluidization gas to the gasifier may be, without limitation, selected from the group consisting of steam, flue gas, synthesis gas, Low Pressure ('LP') fuel gas, tailgas (e.g., Fischer-Tropsch tailgas, upgrader offgas, VSA tailgas, and/or PSA tailgas) and combinations thereof. In embodiments, the gasifier fluidization gas comprises Fischer-Tropsch tailgas. In embodiments, the gasifier fluidization gas comprises upgrader tailgas. By utilizing upgrader tailgas, additional sulfur removal may be effected by the system, as the upgrader tailgas may comprise sulfur.

In embodiments, the pyrolyzer fluidization gas comprises PSA tailgas. Such embodiments may provide substantial hydrogen in the gasifier product gas, and may be most suitable for subsequent utilization of the product gas in downstream processes for which higher molar ratios of hydrogen to carbon monoxide are desirable. For example, higher molar ratios of hydrogen to carbon monoxide may be desirable for downstream processes such as a nickel dual fluidized bed gasification (e.g., for which $H_2$/CO ratio of about 1.8:1 to about 2:1 may be desired). Such a dual fluidized bed (DFB) gasifier is disclosed, for Example, in U.S. patent application Ser. No. 12/691,297 filed Jan. 21, 2010 (and now U.S. Pat. No. 8,241,523), the disclosure of which is hereby incorporated herein for all purposes not contrary to this disclosure. Utilization of PSA tailgas for gasifier fluidization gas may be less desirable for subsequent utilization of the gas for POx (for which $H_2$/CO ratios closer to or about 1:1 may be more suited), as the hydrogen may be undesirably high. In embodiments, the gasification product gas is controlled (for example, in a burner) to a dried moisture content of less than a desired amount (e.g., less than about 10, 11, 12, 13, 14, or 15 weight percent) in order to provide a suitable composition (e.g., $H_2$/CO molar ratio) for downstream processing (e.g., for downstream POx). In embodiments, a combination of feed drying (at 100), DFB indirect gasification (at 200), and POx (at 300) is utilized to provide a synthesis gas suitable for downstream Fischer-Tropsch synthesis (at 400) utilizing an iron or cobalt catalyst.

The temperature at or near the top of the pyrolyzer (e.g., proximate entrained product removal therefrom) may be in the range of from about 1000° F. to about 1700° F., from about 1100° F. to about 1600° F., from about 1200° F. to about 1600° F., from about 1000° F. to about 1500° F., from about 1100° F. to about 1500° F., from about 1200° F. to about 1500° F., from about 1000° F. to about 1400° F., from about 1100° F. to about 1400° F., from about 1200° F. to about 1400° F., from about 1200° F. to about 1450° F., from about 1200° F. to about 1350° F., from about 1250° F. to about 1350° F., from about 1300° F. to about 1350° F., or about 1350° F.

In embodiments, the gasifier pressure is greater than about 2 psig. In embodiments, the gasifier pressure is less than or equal to about 45 psig. In embodiments, the gasifier pressure is in the range of from about 2 psig to about 45 psig. In embodiments, the gasifier/pyrolyzer is operable at low pressure, for example, less than 25 or 50 psig, or in the range of from about 25-50 psig.)

Circulating heat transfer material may be introduced via heat transfer line 25 into a lower region of pyrolyzer 20. The heat transfer material may be introduced approximately opposite introduction of the gasifier feed material. To maintain suitable flow, the HTM inlet may be at an angle γ in the range of from about 20 degrees to about 90 degrees, or at an angle γ of greater than or about 20, 30, 40, 50, or 60 degrees. The heat transfer material may be introduced at a temperature in the range of from about 1400° F. to about 2000° F., from about 1450° F. to about 1600° F., from about 1525° F. to about 1575° F., or about 1550° F.

In embodiments, a gas distributor 95 is configured for introduction of gasifier fluidization gas into pyrolyzer 20. In embodiments, the circulating heat transfer material is introduced to pyrolyzer 20 at a location at least 4, 5, 6, 7, 8, 9 or 10 inches above the pyrolyzer gas distributor 95. The heat transfer material may be introduced at a position in the range of from about 4 to about 10 inches, or from about 4 to about 6 inches above distributor 95. In embodiments, the distributor is operable to provide a gas flow rate of at least or about 4, 5, 6, 7, 8, 9, or 10 ft/s, for example, during startup. Gasifier distributor 95 (and/or a distributor in a combustor seal pot, a gasifier seal pot, and/or the combustor) may comprise a ring distributor, a pipe distributor, a Christmas tree distributor, or other suitable distributor design known in the art. In embodiments, the distributor comprises a pipe distributor that may be loaded through a side of the vessel for ease of nozzle replacement thereon (generally suitable in embodiments in which the running pressure is less than 12 or 15 psig inclusive). Distributors with fewer inlets (e.g., Christmas tree distributors and/or ring distributors) may be more desirable for higher pressure applications.

In embodiments, the temperature differential between the gasifier and the combustor (i.e. $T_C$-$T_G$) is maintained at less than about 200° F., 210° F., 220° F., 230° F., 240° F., 250° F., 260° F., 270° F., 280° F., 290° F., 300° F., 310° F., 320° F., 330° F., 340° F., or 350° F., or is maintained at a temperature within any range therebetween. If $T_C$-$T_G$ is greater than about 300° F., sand or other (e.g., elevated temperature) heat transfer material may be added to the system.

As mentioned hereinabove, a suitable DFB indirect gasification apparatus 200' may comprise one or more gas/solid separator (e.g., one or more cyclone) on the gasifier outlet. The system may comprise primary and/or secondary gasifier particulate separators (e.g., primary gasifier cyclone(s) 40 and/or secondary gasifier cyclone(s) 50). In embodiments, the gasifier separators are operable/configured to provide a HTM removal efficiency of at least or about 98, 99, 99.9, or 99.99%. In embodiments, the primary gasifier separators 40 are operable to remove at least or about 99.99% of the heat transfer material from a gas introduced thereto. Higher removal of heat transfer material is generally desirable, as the cost of makeup particulate heat transfer material and the cost of heating same to operating temperature are considerable. The secondary gasifier particulate separator(s) 50 (e.g., cyclones) may be configured to remove at least about 80, 85, 90 or 95% of the char (and/or ash) in the gasifier product gas introduced thereto. In embodiments, the secondary gasifier separators 50 are operable to remove at least about 95% of the ash and/or char introduced thereto. There may be some (desirably minimal) amount of recycle ash.

The product synthesis gas exiting the gasifier separators may be utilized for heat recovery in certain embodiments. In embodiments, the synthesis gas is not utilized for heat recovery. In embodiments, no heat recovery is incorporated on the syngas and the system further comprises a POx unit (e.g., conditioner 330), a nickel dual fluidized bed gasifier and/or a boiler downstream of the gasifier separator(s). It is envisaged that heat recovery apparatus may be positioned between and/or downstream of the primary and/or secondary separators. When utilized for heat recovery, the temperature of the synthesis gas may be maintained at a temperature of at least 600° F., at least 650° F., at least 700° F., at least 750° F. or at least 800° F. after heat recovery. For example, maintenance of a temperature of greater than 650° F., 700° F., 750° F., 800° F., 850° F., or 900° F. may be desirable when heat recovery is upstream of tar removal (for example, to prevent condensation of tars). In embodiments, the synthesis gas is maintained at a temperature in the range of from about 650° F. to about 800° F. during heat recovery. In embodiments, the system comprises a steam superheater and optionally there-following a waste heat boiler or waste heat superheater downstream of the gasifier separators for heat recovery from the hot gasification gas comprising syngas, and for the production of steam. In embodiments, the system comprises an air preheater for heat recovery from the hot synthesis gas. In embodiments, the system comprises a boiler feedwater (BFW) preheater for heat recovery from the hot synthesis gas. The system may comprise an air preheater, (for example to preheat air for introduction into the combustor, as the introduction of hotter air into the combustor may be desirable). The system may comprise any other suitable apparatus known to those of skill in the art for heat recovery.

As mentioned hereinabove, in addition to or in place of steam, the seal pot fluidization gas may comprise any of the alternate fluidization gases described hereinabove. For example, combustor flue gas and/or recycled synthesis gas may be utilized as fluidization gas for the GSP. In embodiments, the fluidization gas for the CSP, the GSP or both comprises steam. When recycled synthesis gas is utilized for fluidization of the GSP, the synthesis gas is returned to the gasifier and may provide additional clean synthesis gas from the DFB system. By using non-steam as the fluidization gas in the seal pot(s), steam may be reduced or substantially eliminated from the product gas, thus increasing the Wobbe Number thereof, which may be beneficial for downstream processes (such as, for example, downstream power production, discussed further hereinbelow). In embodiments, upgrader tailgas comprising sulfur is utilized as fluidization gas for the GSP.

Sulfur may exit the disclosed DFB indirect gasification apparatus 200' with the process gas, the combustor flue gas, and/or with the ash. Removal of the sulfur as a solid may be desired. In embodiments, ash (e.g., wood ash) from the ash removal cyclones is utilized to remove mercaptan sulfur and/or $H_2S$ from synthesis gas. In embodiments, mercaptan sulfur and/or $H_2S$ removal is performed at a pH of greater than or about 7.5, 7.7, or 8. In embodiments, the ash (e.g., wood ash) comprises, for example, NaOH and/or $Ca(OH)_2$. In embodiments, a 'sulfur-grabber' or sulfur extraction material is added with the heat transfer material, such that sulfur may be removed with ash. The sulfur-grabber may comprise a calcium material, such as calcium oxide (CaO), which may be converted to calcium sulfide and exit the system as a solid. In embodiments, ash water (comprising NaOH and/or $Ca(OH)_2$) is utilized to scrub sulfur from the outlet gases. For example, the system may comprise a scrubbing tower for cleaning the process gas. Depending on the basicity of the ash water, it may be utilized, in embodiments, as scrubbing water. Such scrubbing may be performed upstream of an ESP or other particulate separator configured to remove particulates.

The different fluidization gases mentioned for the CSP may be utilized for the GSP as well. (In embodiments, a percentage of air (e.g., less than 4 volume percent) may be utilized on the GSP to provide higher temperature in the gasifier). In embodiments, the fluidization gas on the GSP is selected from the group consisting of flue gas, steam, recycled synthesis gas, and combinations thereof.

For the GSP, the minimum fluidization velocity for the heat transfer material is set at any point in time. That is, the minimum initial fluidization velocity may be determined by the initial average particle size (e.g., 100 μm). After a time on stream (for example, 120 days), the heat transfer material may have a reduced average particle size (e.g., about 25 μm); thus the minimum fluidization velocity changes (decreasing with time on stream/HTM size reduction). The CSP and GSP may be selected such that they have a size suitable to handle the highest anticipated fluidization velocity, i.e. generally the start-up value. In embodiments, the minimum fluidization velocity of the GSP is initially high and decreases with time. However, it is possible that, if agglomerization occurs, the minimum fluidization velocity may increase. The minimum fluidization velocity is determined by the heat transfer material, in particular by the average particle size, the density, and/or the void fraction thereof. In embodiments, the minimum fluidization velocity is greater than about 0.2 ft/s. In embodiments, the minimum fluidization velocity is greater than about 1.5 ft/s. As the PSD decreases, seal pot fluidization velocity decreases.

The diameter of the seal pots may be set by the number of dipleg penetrations, i.e. how many cyclones you have and/or by the angles at which the diplegs enter into the seal pot. Diplegs may be angled to allow shorter dipleg length. In embodiments, combustor cyclone dipleg(s) 61 enter the top of the gasifier seal pots, as with the CSP (where gasifier cyclone diplegs 41/51 enter the CSP). The CSP and/or the GSP may contain a distributor configured for distributing gas uniformly across the cross-section (e.g., the diameter) thereof. In embodiments, the distributor is positioned at or near the bottom of the CSP and/or the GSP. In embodiments, to minimize/avoid erosion of the seal leg, the minimum distance between the distributor (i.e. the fluidization nozzles) at the bottom of the seal pot (GSP and/or CSP) and the bottom of the dipleg(s) projecting thereinto is 10, 11, 12, 13, 14, 15, 16, 17 or 18 inches. In embodiments, there is a distance of more than 15, 16, 17 or 18 inches between the seal pot distributor and the cyclone dipleg(s). Desirably, the dipleg-to-dipleg spacing and/or the dipleg-to-refractory ID spacing is at least 10, 11, or 12 inches. In embodiments, the dipleg-to-dipleg spacing and the dipleg-to-refractory ID spacing is at least about 12 inches. In embodiments, the diplegs are supported. Such support may be provided to minimize/prevent vibration of the diplegs. For the GSP, the seal may actually be within the dipleg of the combustor cyclone(s) and the GSP (since gasifier 20 is at a higher pressure than combustor separator 60).

A GSP may be designed with an adequate head of heat transfer material to minimize backflow. The height of the GSP can be based on a design margin. In embodiments, the design margin is in the range of from about 1 psig to about 5 psig, or is greater than or about equal to 1, 2, 3, 4, or 5 psig. The head of heat transfer material (e.g., sand) will provide the ΔP (pressure drop) at least sufficient to prevent backflow of gas/prevent gasifier backflowing into the combustor cyclone(s) 60. The distribution of nozzles in both the CSP and the GSP may be in the range of from about one to about four nozzles per square foot. In embodiments, the distributors in any or all vessels (gasifier, combustor, CSP and GSP) comprise from about one to about four nozzles per ft$^2$.

In embodiments, one or more of the seal pots (either or both a combustor seal pot, CSP, and/or a gasifier seal pot, GSP) is replaced with an L valve or a J valve. In embodiments, the disclosed DFB indirect gasification system comprises one or more J valves in place of a CSP. In embodiments, the DFB indirect gasification system comprises one or more J valves in place of a GSP. In embodiments, the DFB indirect gasification system comprises multiple CSPs. In embodiments, the multiple CSPs are substantially identical. In embodiments, the DFB indirect gasification system comprises multiple GSPs. In embodiments, the multiple GSPs are substantially identical. In embodiments, the disclosed gasification system comprises at least one or one CSP and at least one or one GSP. The seal of the CSP may be within the CSP (while the seal on the GSP may simply be within a dipleg). In embodiments, a J valve is utilized on the gasifier rather than a GSP.

The height of the CSP may be determined by the pressure needed for the seal, which is the differential pressure between the gasifier cyclone(s) (40 and/or 50) and the combustor 30. The combustor pressure plus a design margin may be utilized to determine the desired height of the CSP (i.e. the desired height of the heat transfer material therein). In embodiments, the pressure is near atmospheric. In embodiments, the ΔP is greater than 2 psig. In embodiments, the ΔP is in the range of from about 2 psig to about 25 psig, from about 2 psig to about 20 psig, or from about 2 psig to about 15 psig. In embodiments, the pressure differential is about 10, 12, 15, or 20 psig. Desirably, the ΔP is not less than about 2 psig, as pressure equalization is undesirable. In embodiments, a smaller ΔP is utilized, thus allowing the use of a shorter CSP 70.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term 'optionally' with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

What is claimed is:

1. A method of producing synthesis gas, the method comprising:
   introducing a feed material to be gasified into an indirect gasification apparatus comprising at least one fluidized component operable as a fluidized bed, and selected from the group consisting of fluidized bed pyrolyzers and seal pots, wherein the gasification apparatus is configured to convert at least a portion of the feed material into a gasifier product gas comprising synthesis gas;
   maintaining fluidization of the at least one fluidized component by introducing a fluidization gas thereto, wherein the fluidization gas comprises steam, and at least one component other than steam, wherein the fluidization gas comprises at least 50 volume percent of the at least one other component; and
   converting at least a portion of the synthesis gas into Fischer-Tropssch hydrocarbons via Fischer-Tropsch synthesis.

2. The method of claim 1 wherein the fluidization gas comprises less than 40 volume percent steam.

3. The method of claim 1 wherein the at least one component is selected from the group consisting of natural gas, flue gas, synthesis gas, LP fuel gas, Fischer-Tropsch tailgas, product upgrader tailgas, VSA tailgas, PSA tailgas, exhaust gas, $CO_2$-rich gas, dryer vent gas, combustion air, oxygenates, and combinations thereof.

4. The method of claim 1 further comprising producing the at least one component downstream of the gasification apparatus.

5. The method of claim 4 further comprising conditioning the gasifier product gas to provide a conditioned synthesis gas having a molar ratio of hydrogen to carbon monoxide that is different from the molar ratio of hydrogen to carbon monoxide in the gasifier product gas, a reduced amount of at least one component relative to the amount of that component in the gasifier product gas, or both.

6. The method of claim 5 further comprising separating hydrogen from at least a portion of the conditioned synthesis gas to provide a separated hydrogen stream and a hydrogen-reduced gas, and utilizing at least a portion of the hydrogen-reduced gas as fluidization gas.

7. The method of claim 6 further comprising converting at least a portion of the conditioned synthesis gas into Fischer-Tropsch hydrocarbons via Fischer-Tropsch synthesis, and upgrading at least a portion of the Fischer-Tropsch hydrocarbons via reaction with at least a portion of the separated hydrogen stream.

8. The method of claim 5 wherein conditioning the gasifier product gas comprises introducing at least a portion of the gasifier product gas into a synthesis gas conditioner configured to alter the molar ratio of hydrogen to carbon monoxide in the gasifier product gas.

9. The method of claim 8 wherein the synthesis gas conditioner comprises a partial oxidation reactor.

10. The method of claim 9 wherein the partial oxidation reactor is configured for operation at a temperature in the range of from about 900° C. to about 1500° C.

11. The method of claim 10 further comprising producing oxygen-enriched air for introduction into the partial oxidation reactor, whereby producing oxygen-enriched air produces a nitrogen-rich product, and utilizing at least a portion of the nitrogen-rich product as gasifier fluidization gas.

12. The method of claim 11 wherein producing oxygen-enriched air comprises vacuum swing adsorption.

13. The method of claim 5 wherein synthesis gas conditioning comprises reforming at least a portion of the synthesis gas, thus producing a conditioned synthesis gas having an altered molar ratio of hydrogen to carbon monoxide relative to the molar ratio of hydrogen to carbon monoxide in the gasifier product gas.

14. The method of claim 5 wherein synthesis gas conditioning comprises extracting a carbon dioxide-rich fuel gas from at least a portion of the gasifier product gas, and wherein the method further comprises utilizing at least a portion of the carbon dioxide-rich fuel gas as fluidization gas.

15. The method of claim 14 wherein extracting a carbon dioxide-rich fuel gas from at least a portion of the gasifier product gas comprises introducing the at least a portion of the gasifier product gas into a carbon dioxide removal unit.

16. The method of claim 15 wherein the carbon dioxide removal unit operates via pressure differentiation.

17. The method of claim 16 wherein the carbon dioxide removal unit is a pressure swing adsorption (PSA) unit.

18. The method of claim 1 further comprising subjecting at least a portion of the Fischer-Tropsch hydrocarbons to product upgrading, wherein product upgrading produces a product upgrading tailgas, and utilizing at least a portion of the product upgrading tailgas as fluidization gas.

19. The method of claim 18 wherein the at least one fluidized component comprises a fluidized bed gasifier, and wherein at least a portion of the product upgrading tailgas is introduced as gasifier fluidization gas.

20. The method of claim 1 wherein Fischer-Tropsch conversion of the at least a portion of the synthesis gas produces a Fischer-Tropsch tailgas, and wherein at least a portion of the Fischer-Tropsch tailgas is utilized as fluidization gas.

21. The method of claim 20 further comprising extracting a carbon dioxide-enriched gas from at least a portion of the Fischer-Tropsch tailgas, and utilizing at least a portion of the carbon dioxide-enriched gas as fluidization gas.

22. The method of claim 21 wherein extracting a carbon dioxide-enriched gas from at least a portion of the Fischer-Tropsch tailgas comprises contacting the at least a portion of the Fischer-Tropsch tailgas with a membrane designed for hydrogen recovery, thus providing a low BTU carbon dioxide-enriched fuel gas, and utilizing at least a portion of the carbon dioxide-enriched gas as fluidization gas.

23. The method of claim 20 wherein Fischer-Tropsch synthesis is associated with the production of a Fischer-Tropsch wastewater comprising oxygenates, and wherein the method further comprises stripping oxygenates from at least a portion of the Fischer-Tropsch wastewater via contact thereof with at least a portion of the Fischer-Tropsch tailgas, to produce an oxygenate-containing Fischer-Tropsch tailgas and an oxygenate-reduced Fischer-Tropsch wastewater, and utilizing at least a portion of the oxygenate-containing Fischer-Tropsch tailgas as fluidization gas.

24. The method of claim 1 wherein Fischer-Tropsch synthesis is associated with the production of a Fischer-Tropsch wastewater comprising oxygenates, and wherein the method further comprises stripping oxygenates from at least a portion of the Fischer-Tropsch wastewater via contact thereof with steam, to produce an oxygenate-containing steam and an oxygenate-reduced Fischer-Tropsch wastewater, and utilizing at least a portion of the oxygenate-containing steam as fluidization gas.

25. The method of claim 1 wherein a hydrocarbon-containing purge gas is extracted during Fischer-Tropsch synthesis, and wherein at least a portion of the hydrocarbon-containing purge gas is utilized as fluidization gas.

26. The method of claim 1 further comprising producing the at least one component upstream of the gasification apparatus.

27. The method of claim 26 wherein the at least one component comprises natural gas.

28. The method of claim 26 further comprising drying at least a portion of the feed material to reduce the moisture content thereof prior to introduction into the gasification apparatus.

29. The method of claim 28 wherein drying the at least a portion of the feed material further comprises contacting the at least a portion of the feed material with a drying medium to provide a reduced moisture gasifier feed material and a dryer vent gas comprising volatile organic compounds (VOC's).

30. The method of claim 29 further comprising utilizing at least a portion of the dryer vent gas as fluidization gas.

31. The method of claim 30 wherein the drying medium comprises superheated steam.

32. The method of claim 1 wherein the gasification apparatus comprises a dual fluidized bed gasifier comprising a fluidized bed pyrolyzer fluidly connected with a fluidized bed combustor such that a circulation stream comprising a heat transfer material can be continuously circulated between the pyrolyzer, in which the temperature of the circulation stream is reduced via endothermal pyrolysis, and the fluidized bed combustor, in which the temperature of the circulation stream is increased, wherein the fluidized bed combustor is operable to increase the temperature of the circulation stream via combustion of at least char introduced thereto with the circulation stream.

33. The method of claim 32 wherein combustion in the combustor produces a combustor flue gas, and wherein the method further comprises utilizing at least a portion of the combustor flue gas as fluidization gas.

34. The method of claim 33 wherein the gasifier feed material is introduced into the pyrolyzer from a feed bin configured for storage of gasifier feed material, and wherein the method further comprises introducing at least a portion of the combustor flue gas into the feed bin, whereby direct contact of the combustor flue gas with the gasifier feed material provides a dried gasifier feed material for introduction into the pyrolyzer and a feed bin vent gas, and wherein the method further comprises utilizing at least a portion of the feed bin vent gas as fluidization gas.

35. The method of claim 32 wherein combustion in the combustor is effected via introduction thereto of hot combustion air, and wherein the method further comprises utilizing a portion of the hot combustion air as fluidization gas for at least one other component of the dual fluidized bed gasifier in addition to the fluidized bed combustor.

36. The method of claim 1 wherein the gasification apparatus comprises a pyrolyzer operable at low pressure, and wherein the at least one component comprises low pressure (LP) fuel gas.

37. The method of claim 1 further comprising utilizing at least a portion of the gasifier product gas to produce power, utilizing at least a portion of the gasifier product gas in a catalytic operation downstream of the gasification apparatus, or both.

38. The method of claim 1 further comprising obtaining a desired molar ratio of hydrogen to carbon monoxide in the gasifier product gas by adjusting the amount, composition, or both the amount and the composition of the at least one non-steam component of the fluidization gas.

39. The method of claim 1 further comprising adjusting the amount, composition, or both the amount and the composition of the at least one non-steam component of the fluidization gas such that the moisture content of the gasifier product gas is below a desired level.

40. The method of claim 1 further comprising performing vacuum swing adsorption (VSA), pressure swing adsorption (PSA), or both, downstream of the gasification apparatus, thus producing at least one tailgas selected from the group consisting of VSA tailgas and PSA tailgas, and utilizing at least a portion of the at least one tailgas as the at least one non-steam component of the fluidization gas.

41. The method of claim 1 further comprising producing, downstream of the gasifier, at least one other product selected from the group consisting of power and non-Fischer-Tropsch chemicals from a portion of the gasifier product gas.

42. The method of claim 41 further comprising utilizing at least a portion of a hydrocarbon-containing fluid produced downstream of the gasifier as the at least one non-steam component of the fluidization gas.

43. The method of claim 1 wherein the at least one fluidized component is selected from the group consisting of fluidized bed pyrolyzers.

44. The method of claim 1 further comprising utilizing at least a portion of the gasifier product gas directly as fluidization gas.

45. The method of claim 1 wherein the fluidization gas is a low oxygen content gas comprising less than about 14 volume percent oxygen.

46. The method of claim 45 wherein the fluidization gas comprises less than about 4 volume percent oxygen.

* * * * *